(12) United States Patent
Nomura

(10) Patent No.: US 7,250,984 B2
(45) Date of Patent: Jul. 31, 2007

(54) VDT STRESS MITIGATING DEVICE AND METHOD, VDT STRESS RISK QUANTIFYING DEVICE AND METHOD, AND RECORDING MEDIUM

(75) Inventor: Masahide Nomura, deceased, late of Sendai (JP); by Naoko Nomura, legal representative, Sendai (JP)

(73) Assignee: NEC Corporation, Tokyo (JP)

( * ) Notice: Subject to any disclaimer, the term of this patent is extended or adjusted under 35 U.S.C. 154(b) by 547 days.

(21) Appl. No.: 10/867,477

(22) Filed: Jun. 14, 2004

(65) Prior Publication Data

US 2005/0012864 A1   Jan. 20, 2005

Related U.S. Application Data

(62) Division of application No. 09/717,499, filed on Nov. 21, 2000, now abandoned.

(30) Foreign Application Priority Data

Nov. 24, 1999  (JP)  ................... 11-333429

(51) Int. Cl.
*H04N 5/00* (2006.01)
*H04N 5/21* (2006.01)
*H04N 9/77* (2006.01)
*H04N 9/78* (2006.01)
*G06K 9/40* (2006.01)

(52) U.S. Cl. ..................... 348/607; 348/625; 348/665; 382/260; 382/264

(58) Field of Classification Search .................... None
See application file for complete search history.

(56) References Cited

U.S. PATENT DOCUMENTS 4,300,162 A   11/1981   Robers (Continued)

FOREIGN PATENT DOCUMENTS

EP   0 239 809   7/1987

(Continued)

OTHER PUBLICATIONS

"Comparison Between Median Filtering and Vertical Edge Controlled Interpolation for Flicker Reduction", Dipl.-Ing. Christian Hentschel, IEEE Transactions on Consumer Electronics, vol. 35, No. 3 (1989), New York, USA.

*Primary Examiner*—Brian P. Yenke
(74) *Attorney, Agent, or Firm*—Scully, Scott, Murphy & Presser, P.C.

(57) ABSTRACT

The aim of the present invention is to provide a VDT stress mitigating device and method capable of mitigating VDT stress caused by a regular spatial pattern and VDT stress caused by flicker generated by an interlaced format, a VDT stress risk quantifying device and method, and a recording medium. An A/D conversion section 10 imports interlaced format video signals P1 from an external image signal output device and converts them in field units by A/D conversion into image data D1. A filter section 20, while not distinguishing between the first field and the second field, and while maintaining the temporal order of these fields, performs a temporal filtering process on the image data of each field. A D/A conversion section 30 converts the image data D2 that has undergone the temporal filtering process by the filter section 20 into image signals P2 based on an interlaced format by D/A conversion. The image signals P2 are then sequentially outputs according to the temporal order of the fields.

4 Claims, 14 Drawing Sheets

U.S. PATENT DOCUMENTS

| | | |
|---|---|---|
| 5,386,249 A | 1/1995 | Strolle et al. |
| 5,796,445 A | 8/1998 | Nomura et al. |
| 5,903,680 A | 5/1999 | De Haan et al. |
| 5,956,096 A | 9/1999 | Nomura et al. |
| 5,963,262 A | 10/1999 | Ke et al. |
| 6,067,120 A | 5/2000 | Horikawa et al. |
| 6,392,718 B1 | 5/2002 | Muramatsu |
| 6,421,097 B1 | 7/2002 | O'Rourke |

FOREIGN PATENT DOCUMENTS

| | | |
|---|---|---|
| EP | 0 239 800 A2 | 10/1987 |
| EP | 0 318 760 A2 | 6/1989 |
| EP | 0 327 995 | 8/1989 |
| EP | 0 554 495 A1 | 8/1993 |
| JP | 7-101977 | 4/1995 |
| WO | WO 90/15503 | 12/1990 |
| WO | WO 99/37091 | 7/1999 |

EXAMPLE OF A REGULAR SPATIAL PATTERN

VDT STRESS MITIGATING DEVICE AND METHOD, VDT STRESS RISK QUANTIFYING DEVICE AND METHOD, AND RECORDING MEDIUM

CROSS-REFERENCE TO RELATED APPLICATIONS

This application is a divisional of U.S. Application No. 09/717,499, filed on Nov. 21, 2000, now abandoned which claims the benefit of Japanese Application No. 11-333429 filed in Japan on Nov. 24, 1999, the contents of both which are incorporated herein in their entirety by this reference.

BACKGROUND OF THE INVENTION

1. Field of the Invention

The present invention relates to a VDT (video display terminal) stress mitigating device and method, a VDT stress risk quantifying device and method, and a recording medium for reducing VDT stress such as excessive strain and fatigue caused by visual irritation.

The present application is based on an application for a patent in Japan (Japanese Patent Application Laid-Open (JP-A) No. 11-333429) and the contents disclosed in the above Japanese patent application have been incorporated as a portion of the present specification by reference.

2. Description of the Related Art

Conventionally, image display devices exist, as typified by television receivers, for visually displaying information to people. Various physical symptoms caused by the use of these image display devices are known as what is termed "VDT (video display terminal) stress disease". Hitherto commonly known types of VDT stress include a reduction in visual ability and eyestrain due to long hours of continuously looking at images displayed on an image display device. These types of stress are not connected to the content of the images themselves, but are mainly caused by the way in which the image display device is used.

In contrast, recent years have seen a diversification of graphic expression that has accompanied technological advances in computer graphics and the like. The risk of content generated VDT stress that is caused by the content of the graphics has been pointed out as a new mechanism of VDT stress. Graphic content that causes this type of VDT stress includes intraframe flicker, when a frame image in frequencies between approximately 10 Hz to 30 Hz contained in the graphic content flickers violently. There have been reports that, due to this type of content generated VDT stress, excessive strain and fatigue is caused in the cranial nervous system and the like, and that symptoms resembling travel sickness and, in some cases, even convulsions have been caused.

As a conventional technology for effectively preventing content generated VDT stress, there are known a method and device for selectively attenuating temporal frequency components in the neighborhood of 10 Hz where content generated VDT stress most commonly occurs, such as is disclosed in Japanese Patent Application Laid-Open (JP-A) No. 07-101977 "VDT Stress Mitigating Method, Image Frequency Attenuating Device, and VDT Adapter".

However, in contrast to the aforementioned intraframe flicker in which the frame image flickers depending on the graphic content, even if the graphic content does not involve a flicker phenomenon, as is the case with a static image, then, as can be seen, for example, in the finely striped pattern in the example shown in FIG. 14, the possibility has been pointed out that content generated VDT stress may be caused in people who are predisposed to be hypersensitive to light even when the graphic image is a regular spatial pattern in which the same shapes are arranged in a regular repetition within a space.

However, at present, there is no known technology for mitigating content generated VDT stress caused by this type of regular spatial pattern or for detecting the degree of risk of this type of VDT trouble.

Moreover, in the same way as with regular spatial patterns, even in static images that do not contain any flicker phenomenon in the graphic content itself, when a stripe pattern in the direction of the scan line (horizontal stripes) is displayed at an interval equivalent to the scan line interval on an image display device having an interlaced format, such as NTSC, PAL, or the like, then flicker having a temporal frequency of the frame frequency (30 Hz in NTSC, 25 Hz in PAL) is unexpectedly generated and, as a result, in some cases the same stress as content generated VDT stress is generated.

Specifically, in an interlaced format, because the two fields that form a single frame are scanned at a frequency twice the frame frequency and the two field images within the one frame are divided temporally and displayed in sequence, then, as is shown in FIG. 3 below, for example, when the graphic portions of the striped pattern (i.e. the black portion) and the background portions belong to separate fields, the graphic portions and the background portions are displayed alternately, and flicker having a temporal frequency of the frame frequency is generated.

According to the technology disclosed in the above JP-A 07-101977, it is possible to suppress intraframe flicker. However, because this technology performs a temporal filtering process on each pixel independently, it is not possible in principle to mitigate content generated VDT stress caused by regular spatial patterns contained in the graphics, or VDT stress caused by the aforementioned flicker generated when field images are displayed alternately in an interlaced format. Moreover, nor is it possible to quantatively detect the risk of this type of VDT stress.

SUMMARY OF THE INVENTION

The present invention was achieved in view of the above circumstances, and it is an objective thereof to provide a VDT (video display terminal) stress mitigating device and method capable of mitigating VDT stress caused by a regular spatial pattern and VDT stress caused by flicker generated by an interlaced format, a VDT stress risk quantifying device and method capable of quantatively ascertaining the risk of such VDT stresses, and a recording medium.

In order to achieve this objective, the present invention has the following form.

That is, the first aspect of the present invention is a VDT stress mitigating device that is provided between an image signal output device for outputting image signals based on an interlaced format and an image display device for displaying an image based on the image signal, and performs processing on the image signal in order to mitigate VDT stress, and comprises: filter means (for example, structural elements corresponding to the A/D conversion section 10, the filter section 20, and the D/A conversion section 30, each of which is described below) for performing a temporal filtering process on the image signals of each of a first and second field without any distinction being made between the first and second fields and while the temporal order of these fields is maintained.

The second aspect of the present invention is the VDT stress mitigating device according to the first aspect of the present invention, wherein the filter means comprises: a signal importing section (for example, a structural element corresponding to the A/D conversion section 10 described below) for sequentially importing the image signals in units of fields; a low pass filter section (for example, a structural element corresponding to the filter section 20 described below) for attenuating predetermined frequency components contained in the image signals; and a signal output section (for example, a structural element corresponding to the D/A conversion section 30 described below) for sequentially outputting in accordance with the temporal order the image signals that have undergone the predetermined frequency component attenuation.

The third aspect of the present invention is the VDT stress mitigating device according to the first aspect of the present invention, wherein the filter section comprises: a signal importing section (for example, a structural element corresponding to the A/D conversion section 10 described below) for sequentially importing the image signals in units of fields; a risk quantifying section (for example, a structural element corresponding to the risk quantifying section 100 described below) for quantifying a risk by calculating an index value representing a risk of VDT stress due to the image signals; a low pass filter section (for example, a structural element corresponding to the filter section 200 described below) for attenuating predetermined frequency components contained in the image signals and reflecting the index value such that the risk is suppressed; and a signal output section (for example, a structural element corresponding to the D/A conversion section 30 described below) for sequentially outputting in accordance with the temporal order the image signals that have undergone the predetermined frequency component attenuation.

The fourth aspect of the present invention is the VDT stress mitigating device according to the first aspect of the present invention, wherein the filter means comprises: a signal importing section (for example, a structural element corresponding to the A/D conversion section 10 described below) for sequentially importing the image signals in units of fields; a field dividing section (for example, a structural element corresponding to the field dividing section 15 described below) for dividing each field of the image signals into a plurality of sub-fields; a low pass filter section (for example, a structural element corresponding to the filter section 20 described below) for performing a temporal filtering process on image signals of each sub-field without distinguishing between the plurality of sub-fields and while maintaining the temporal order of the sub-fields, and for attenuating predetermined frequency components contained in an image formed by the image signals; a field synthesizing section (for example, a structural element corresponding to the field synthesizing section 25 described below) for synthesizing image signals of each field from image signals of each sub-field in which the predetermined frequency components have been attenuated; and a signal output section (for example, a structural element corresponding to the D/A conversion section 30 described below) for sequentially outputting in accordance with the temporal order the image signals of each field that have been synthesized by the field synthesizing section.

The fifth aspect of the present invention is a VDT stress risk quantifying device for quantifying a risk of VDT stress due to image signals based on an interlaced format, comprising: a signal holding section (for example, a structural element corresponding to the field memory 101 described below) for importing and temporarily holding the image signals; a low pass filter section (for example, a structural element corresponding to the low pass filter 102 described below) for performing a temporal filtering process on image signals of a first field and a second field without distinguishing between each field and while maintaining the temporal order of the fields, and for attenuating predetermined frequency components contained in an image formed by the image signals; and a calculating section (for example, a structural element corresponding to the risk index value calculator 103 described below) or calculating index values representing the risk based on a difference between image signals that have undergone a temporal filtering process by the low pass filter section and image signals held in the signal holding section.

The sixth aspect of the present invention is the VDT stress mitigating device according to any of the second through fourth aspects of the present invention, wherein the low pass filter section attenuates temporal frequency components that are contained in an image formed by the image signals and that are equivalent to a frame scan frequency.

The seventh aspect of the present invention is the VDT stress mitigating device according to the second aspect of the present invention, wherein the low pass filter section attenuates spatial frequency components that are contained in an image formed by the image signals and that are the highest spatial frequency components in a direction orthogonal to a scan line direction on a device on which the image is displayed.

The eighth aspect of the present invention is the VDT stress mitigating device according to the second aspect of the present invention, wherein the signal importing section is provided with an A/D conversion function for receiving analog quantity image signals input from the image signal output device, converting the analog quantity image signals into digital quantity image data, and outputting this to the low pass filter, and wherein the signal output section is provided with a D/A conversion function for converting digital quantity image data output from the low pass filter section into analog quantity image signals based on an interlaced format.

The ninth aspect of the present invention is the VDT risk stress quantifying device according to the fifth aspect of the present invention, wherein the low pass filter section attenuates temporal frequency components that are contained in an image formed by the image signals and that are equivalent to a frame scan frequency.

The tenth aspect of the present invention is the VDT risk stress quantifying device according to the fifth aspect of the present invention, wherein the low pass filter section attenuates spatial frequency components that are contained in an image formed by the image signals and that are the highest spatial frequency components in a direction orthogonal to a scan line direction on a device on which the image is displayed.

The eleventh aspect of the present invention is a VDT stress mitigation method for mitigating VDT stress by attenuating predetermined frequency components of image signals based on an interlaced format, comprising the following steps: (a) a signal importing step (for example, an element corresponding to step S1 described below) in which the image signals are sequentially imported in units of fields; (b) a filtering step (for example, an element corresponding to step S2 described below) in which a temporal filtering process is performed on image signals of a first field and a second field without distinguishing between each field and while maintaining the temporal order of the fields, and for attenuating predetermined frequency components contained in an image formed by the image signals; and (c) a signal output step (for example, an element corresponding to step S3 described below) in which image signals that have undergone the temporal filtering process are sequentially output in accordance with the temporal order.

The twelfth aspect of the present invention is a VDT stress mitigation method for mitigating VDT stress by attenuating predetermined frequency components of image signals based on an interlaced format, comprising the following steps: (a) a signal importing step (for example, an element corresponding to step S21 described below) in which the image signals are sequentially imported in units of fields; (b) a quantifying step (for example, an element corresponding to step S22 described below) in which a risk is quantified by calculating an index value representing the risk of VDT stress due to the image signals; (c) a filtering step (for example, elements corresponding to steps S23 and S24 described below) in which the index value is reflected and a temporal filtering process is performed on image signals of a first field and a second field without distinguishing between each field and while maintaining the temporal order of the fields such that the risk is suppressed, and predetermined frequency components contained in an image formed by the image signals are attenuated; and (d) a signal output step (for example, an element corresponding to step S25 described below) in which image signals that have undergone the temporal filtering process are sequentially output in accordance with the temporal order.

The thirteenth aspect of the present invention is a VDT stress mitigation method for mitigating VDT stress by attenuating predetermined frequency components of image signals based on an interlaced format, comprising the following steps: (a) a signal importing step (for example, an element corresponding to step S31 described below) in which the image signals are sequentially imported in units of fields; (b) a field dividing step (for example, an element corresponding to step S32 described below) in which each field of the image signals is divided into a plurality of sub-fields; (c) a filtering step (for example, an element corresponding to step S33 described below) in which a temporal filtering process is performed on image signals of each sub-field without distinguishing between the plurality of sub-fields and while maintaining the temporal order of the sub-fields, and for attenuating predetermined frequency components contained in an image formed by the image signals; (d) a field synthesizing step (for example, an element corresponding to step S34 described below) for synthesizing image signals of each field from image signals of each sub-field in which the predetermined frequency components have been attenuated; and (e) a signal output step (for example, an element corresponding to step S35 described below) in which synthesized image signals of each field are sequentially output in accordance with the temporal order.

The fourteenth aspect of the present invention is a VDT stress risk quantifying method for quantifying a risk of VDT stress due to image signals based on an interlaced format, comprising the following steps: (a) a signal importing step (for example, an element corresponding to step S10 described below) in which the image signals are sequentially imported in units of fields; (b) a signal holding step (for example, an element corresponding to step S11 described below) for holding the image signals; (c) a filtering step (for example, an element corresponding to step S12 described below) in which a temporal filtering process is performed on image signals of a first field and a second field without distinguishing between each field and while maintaining the temporal order of the fields, and for attenuating predetermined frequency components contained in an image formed by the image signals; and (d) a calculating step (for example, an element corresponding to step S13 described below) in which index values representing the risk are calculated based on a difference between image signals that have undergone the temporal filtering process and the held image signals.

The fifteenth aspect of the present invention is the VDT stress mitigation method according to the eleventh through thirteenth aspects of the present invention, wherein, in the filtering step, temporal frequency components that are contained in an image formed by the image signals and that are equivalent to a frame scan frequency are attenuated.

The sixteenth aspect of the present invention is the VDT stress mitigation method according to the eleventh through thirteenth aspects of the present invention, wherein, in the filtering step, spatial frequency components that are contained in an image formed by the image signals and that are the highest spatial frequency components in a direction orthogonal to a scan line direction on a device on which the image is displayed are attenuated.

The seventeenth aspect of the present invention is the VDT stress risk quantifying method according to the fourteenth aspect of the present invention, wherein, in the filtering step, temporal frequency components that are contained in an image formed by the image signals and that are equivalent to a frame scan frequency are attenuated.

The eighteenth aspect of the present invention is the VDT stress risk quantifying method according to the fourteenth aspect of the present invention, wherein, in the filtering step, spatial frequency components that are contained in an image formed by the image signals and that are the highest spatial frequency components in a direction orthogonal to a scan line direction on a device on which the image is displayed are attenuated.

The nineteenth aspect of the present invention is a computer readable recording medium on which a program for mitigating VDT stress by attenuating predetermined frequency components of image signals based on an interlaced format is recorded, the program comprising the following steps: (a) a signal importing step in which the image signals are sequentially imported in units of fields; (b) a filtering step in which a temporal filtering process is performed on image signals of a first field and a second field without distinguishing between each field and while maintaining the temporal order of the fields, and for attenuating predetermined frequency components contained in an image formed by the image signals; and (c) a signal output step in which image signals that have undergone the temporal filtering process are sequentially output in accordance with the temporal order.

The main operation of the present invention will now be described.

According to the present invention, image signals based on an interlaced format undergo temporal a filtering process in a first and second field, with the temporal order of the fields being maintained, and with no distinction made between the first and second field and each field being treated as equal to the other. Specifically, the line positions of a first field and second field forming one frame are different to each other. However, in the temporal filtering process, this difference in the line positions is ignored. As a result, the first field and second field are treated as forming temporally continuous images in the same space, and the image signals of each field are made the subjects of the temporal filtering process equally to each other.

At this time, as a result of the temporal filtering process being performed with no distinction being made between the first and second fields, the images interfere with each other between the first and second field so that, in addition to the temporal filtering process, a spatial filtering process is also performed, allowing both temporal and spatial filtering processes to be performed. Consequently, predetermined frequency components contained in an image are attenuated temporally or spatially. After the temporal filtering process has been performed, the image signals are output according to the temporal order of the fields. As a result of the above, image signals, in which those predetermined frequency components that cause VDT stress have been attenuated, are obtained, and VDT stress is mitigated.

The above invention can also be described as follows.

Specifically, the present invention is a VDT stress mitigation method for mitigating VDT stress caused by flicker equal to the frame scan frequency generated by the display of images having a pattern of equally pitched stripes parallel to the scan line direction in a display device for interlaced scan format video signals. This VDT stress mitigation method is characterized in that, by sending the two fields forming each frame of the interlaced image signals to the same field memory and performing a temporal frequency low pass filtering process in a temporal frequency twice that of the frame frequency, an interlaced format video signal image is converted into an image in which the high temporal frequency power components and the high spatial frequency power components have been attenuated simultaneously.

Moreover, the present invention is a VDT stress mitigating device that is provided between an image signal output device for outputting interlaced scan format video signals and the image display device thereof, for mitigating VDT stress caused by flicker equal to the frame scan frequency generated by the display of images having a pattern of equally pitched stripes parallel to the scan line direction. This VDT stress mitigating device is characterized in that, by sending the two fields forming each frame of the interlaced image signals to the same field memory and performing a temporal frequency low pass filtering process in a temporal frequency twice that of the frame frequency, an interlaced format video signal image is converted into an image in which the high temporal frequency power components and the high spatial frequency power components have been attenuated simultaneously.

Further, the present invention is a VDT stress mitigation for mitigating VDT stress caused by the display of images having a regular spatial pattern, and is characterized in that, by performing a load addition for pixels adjacent to each pixel in the image, the image is converted into an image in which the highest spatial frequency components that can be displayed on the display device are attenuated.

Furthermore, the present invention is a VDT stress mitigating device that is provided between an image signal output device and an image display device for mitigating VDT stress caused by the display of images having a regular spatial pattern, and is characterized in that, by performing a load addition for pixels adjacent to each pixel in the image, the image is converted into an image in which the highest spatial frequency components that can be displayed on the display device are attenuated.

According to the present invention, the power of spatial frequency components that are contained in moving images or static images on a display device and are the highest spatial frequency components in a direction orthogonal to the scan line direction capable of being displayed on that display device is detected. In addition, the power of temporal frequency components equivalent to the frame scan frequency of interlaced scan format video signals displayed on the display device is detected. Then on the basis of this, the power of the highest spatial frequency components in a direction orthogonal to the scan line direction capable of being displayed on the display device and that are contained in the displayed images, and the power of temporal frequency components equivalent to the frame scan frequency of interlaced scan format video signals displayed on the display device are attenuated. As a result, content generated VDT stress caused by flicker generated by fine striped patterns in a direction orthogonal to the scan line direction and fine striped patterns, having an equal pitch and parallel to the scan line, are mitigated. In addition, the risk of VDT stress caused by the power of the highest spatial frequency components in a direction orthogonal to the scan line direction capable of being displayed on the display device, and the power of temporal frequency components equivalent to the frame scan frequency is quantified.

In this way, according to the present invention, the size of the power of flicker components of a temporal frequency equivalent to the frame scan frequency generated by images having a pattern of equally pitched stripes parallel to a horizontal scan line of a display device for displaying interlaced format graphic signals is detected. By then appropriately attenuating the power of these components according to the above size, excessive stress on a person viewing the video display device is reduced, and it is possible to prevent any harmful health effects arising therefrom.

Note that this outline of the present invention does not list all necessary features and, consequently, sub-combinations of the features listed here are also considered as belonging to the scope of this invention.

DESCRIPTION OF THE PREFERRED EMBODIMENTS

Next, the embodiments of the present invention will be described with reference made to the drawings.

The embodiments described below in no way limit the invention according to the claims.

Moreover, it is not absolutely necessary for all the features described in the embodiments to be combined together in order to achieve the objectives.

§ 1. First Embodiment

First, the first embodiment of the present invention will be described.

The VDT stress mitigating device according to the first embodiment is installed between an image signal output device such as a video tuner and an image display device such as a video monitor, and, without distinguishing between the first field and second field, performs a temporal filtering process for each field on a video signal (image signal) based on an interlaced format such as NTSC or PAL.

Figure 1:
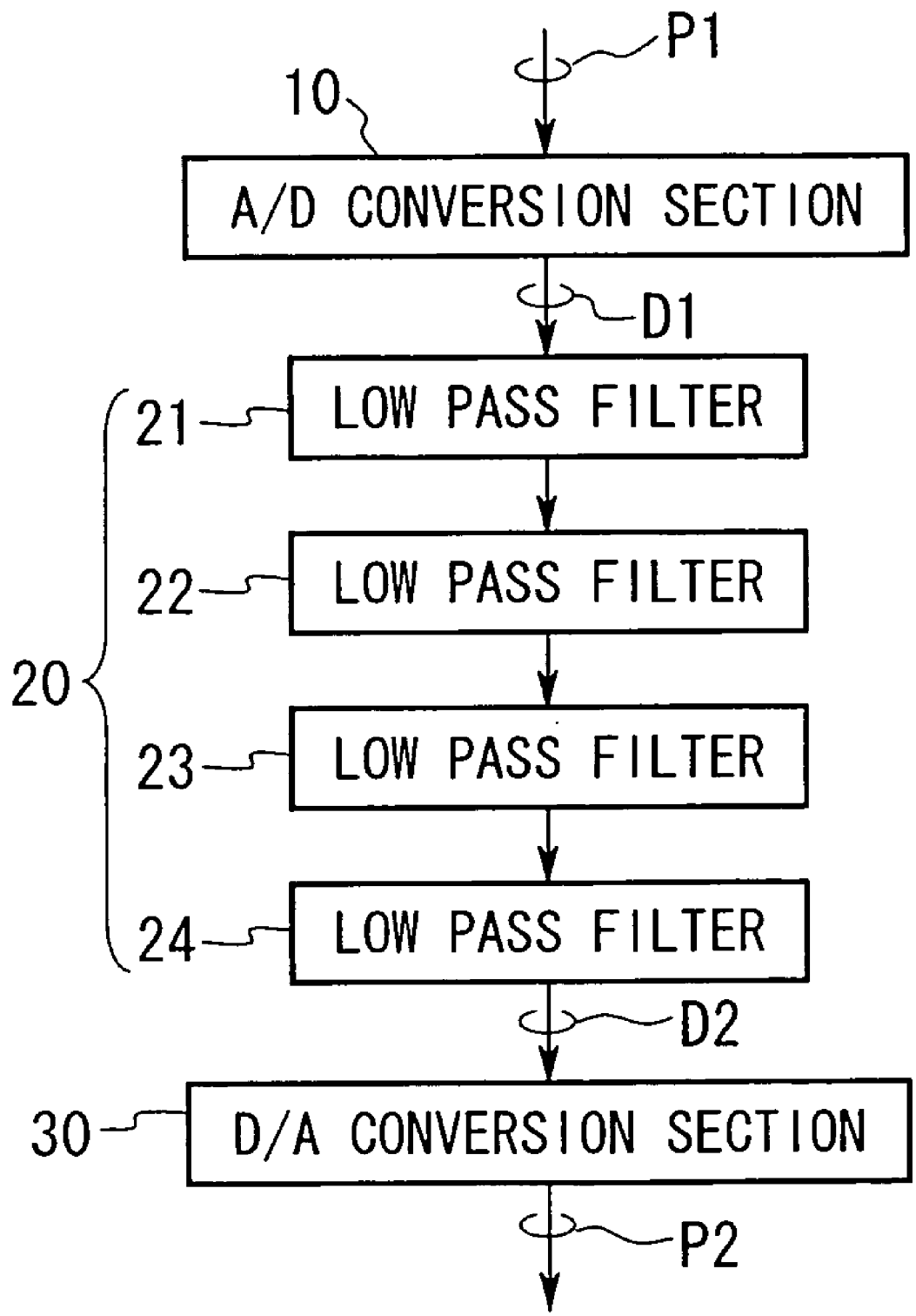
FIG. 1 is a block diagram showing the structure of the VDT stress mitigating device according to the first embodiment of the present invention.

FIG. 1 shows the structure of the VDT stress mitigating device according to the first embodiment. In FIG. 1, the symbol 10 denotes an A/D conversion section. The A/D conversion section 10 sequentially imports analog quantity video signals P1 based on an interlaced format from an unillustrated external image signal output device in field units, and converts these to digital quantity image data (numerical data) D1 by A/D conversion. The symbol 20 denotes a filter section comprising low pass filters 21 to 24 connected in multistage. The filter section 20 attenuates predetermined frequency components (those frequency components that contribute to VDT stress) by implementing a temporal filtering process on the image data D1 while maintaining the temporal sequence of each field without distinguishing between the first field and the second field. The symbol 30 denotes a D/A conversion section. The D/A conversion section 30 performs D/A conversion on digital quantity image data (numerical data) D2 on which a temporal filtering process has been performed by the filter section 20 thus converting it to an analog quantity video signal P2 based on an interlaced format.

Figure 2:
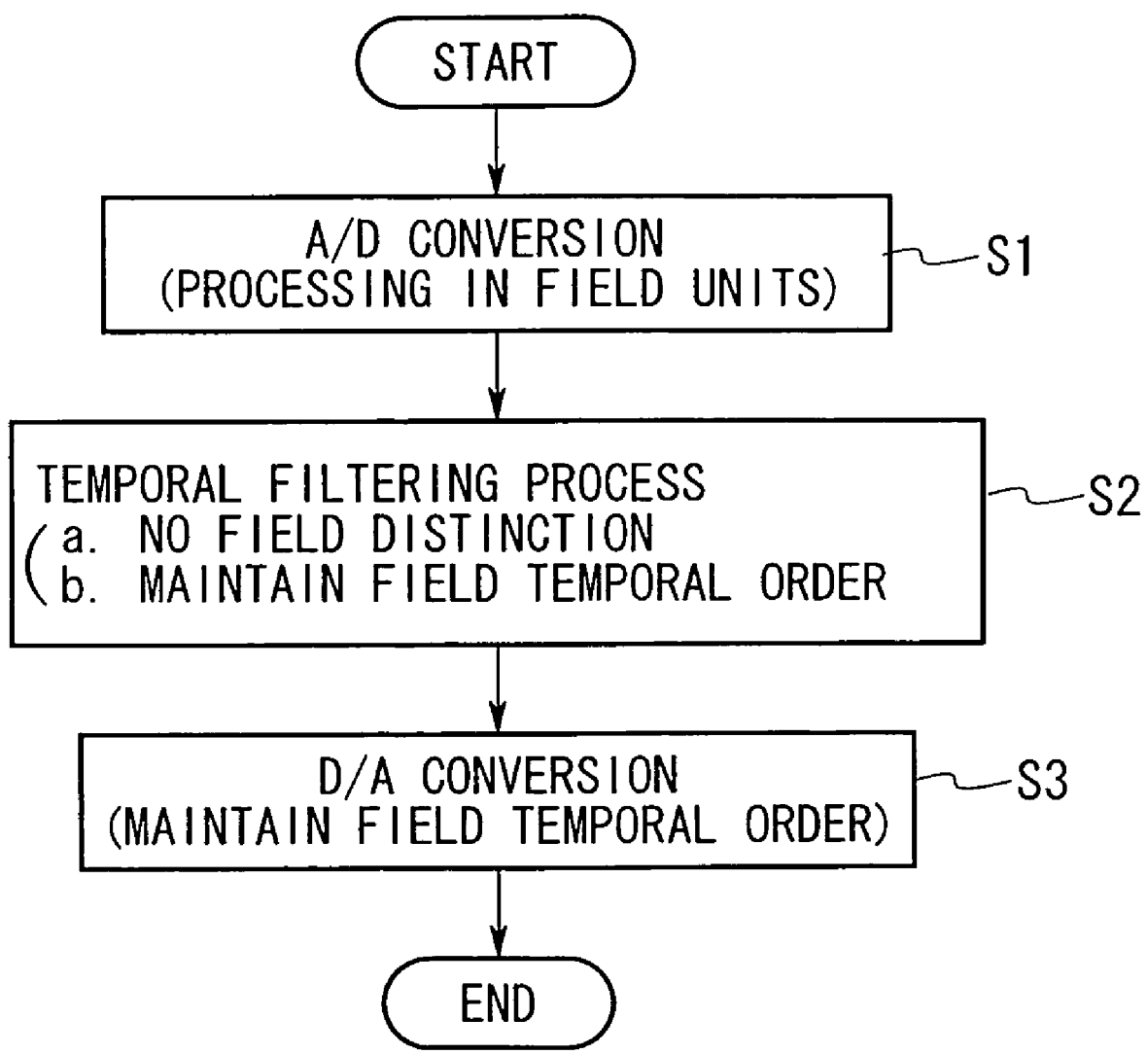
FIG. 2 is a flow chart showing the flow of operation of the VDT stress mitigating device according to the first embodiment of the present invention.

Next, the operation of the VDT stress mitigating device according to the first embodiment will be described according to the routine flow shown in FIG. 2. Note that, in the description below, the term "image signal" refers to a concept that encompasses both analog quantity "video signals" and digital quantity "image data".

First, in step S1, the A/D conversion section 10 sequentially imports analog quantity video signals P1 in an interlaced format from an unillustrated external image signal output device, quantizes these with fields as units, and performs A/D conversion so that the video signals P1 of each field are converted into digital quantity image data D1. When the video signals are in NTSC format, the temporal frequency in frame units is 30 frames per second. Because one frame is formed from both a first field and a second field, the temporal frequency of the video signals in field units becomes 60 fields per second (i.e. twice 30). Accordingly, in this case, in one second, video signals P1 for 60 fields are imported and converted to image data D1. The image data D1 for each field is transferred in sequence to the filter section 30.

In step S2 the filter section 20 performs a temporal filtering process on the image data D1 of each field transferred from the A/D conversion section 10. At this time, the filter section 20 performs the temporal filtering process on the image data of each field while maintaining the temporal sequence of each field without distinguishing between the first field and the second field forming each frame. That is, the images of each field are treated as field images undistinguished from each other, and the filtering process is performed in accordance with the temporal sequence.

At this point, a supplementary explanation will be given on what is meant by the filter section 20 not distinguishing between the first field and the second field with reference made to FIG. 3.

Figure 3:
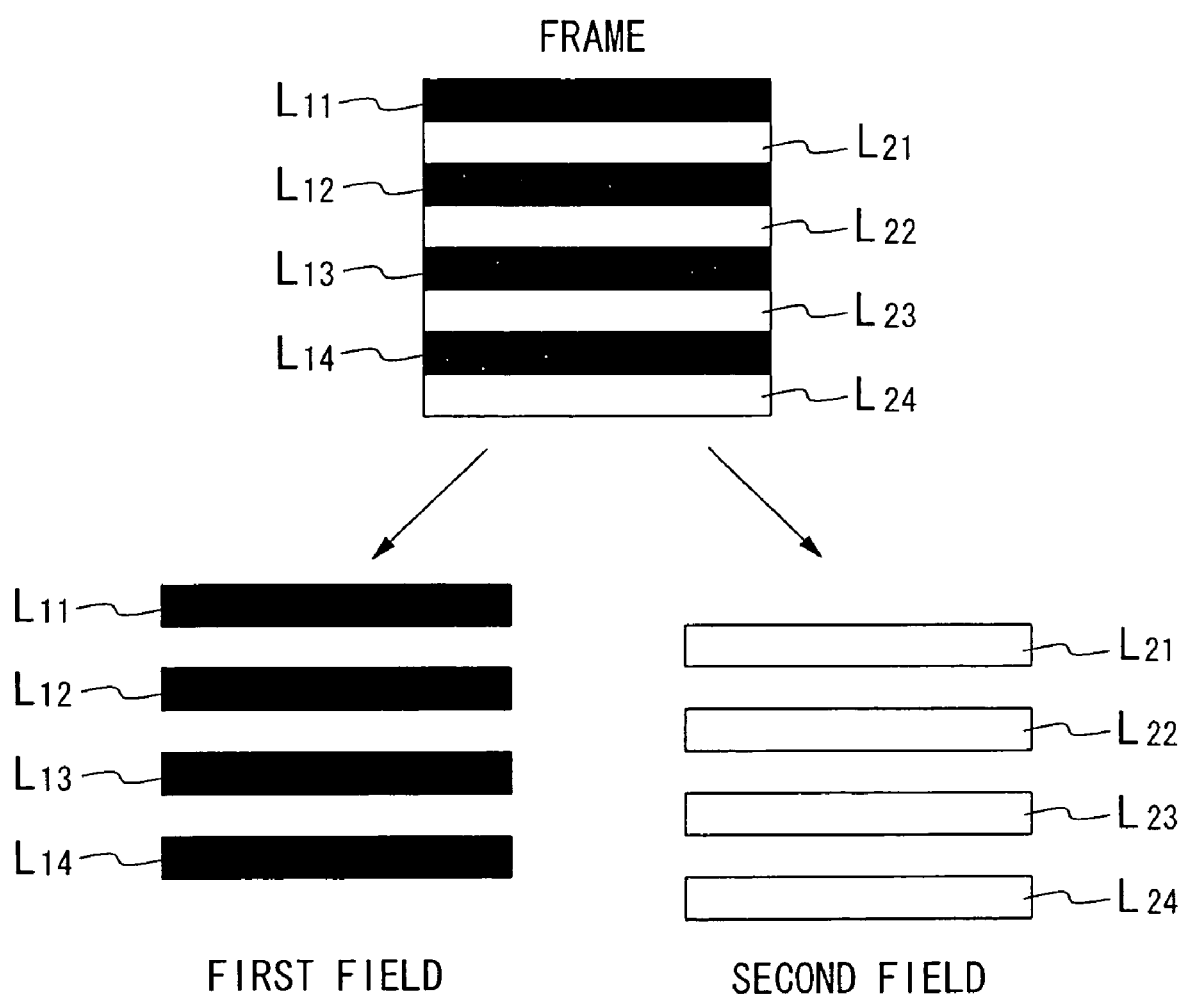
FIG. 3 is an explanatory view for describing the operation of the filter portion (the contents when the field is not distinguished) according to the first embodiment of the present invention.

As is shown in the example in FIG. 3, one frame comprises a first field that contains the odd numbered lines L11 to L14 and a second field that contains the even numbered lines L21 to L24, and the line position is different for each field within a frame. Thus the first field and the second field can be distinguished by the fact that their line positions are different. However, in the temporal filtering process, the filter portion 20 ignores this difference in the line positions and regards the odd numbered lines L11 to L14 in the same way as the even numbered lines L21 to L24. As a result, it makes no distinction between the first field and the second field and treats the images of each field as field images that are undistinguished from each other.

Figure 13:
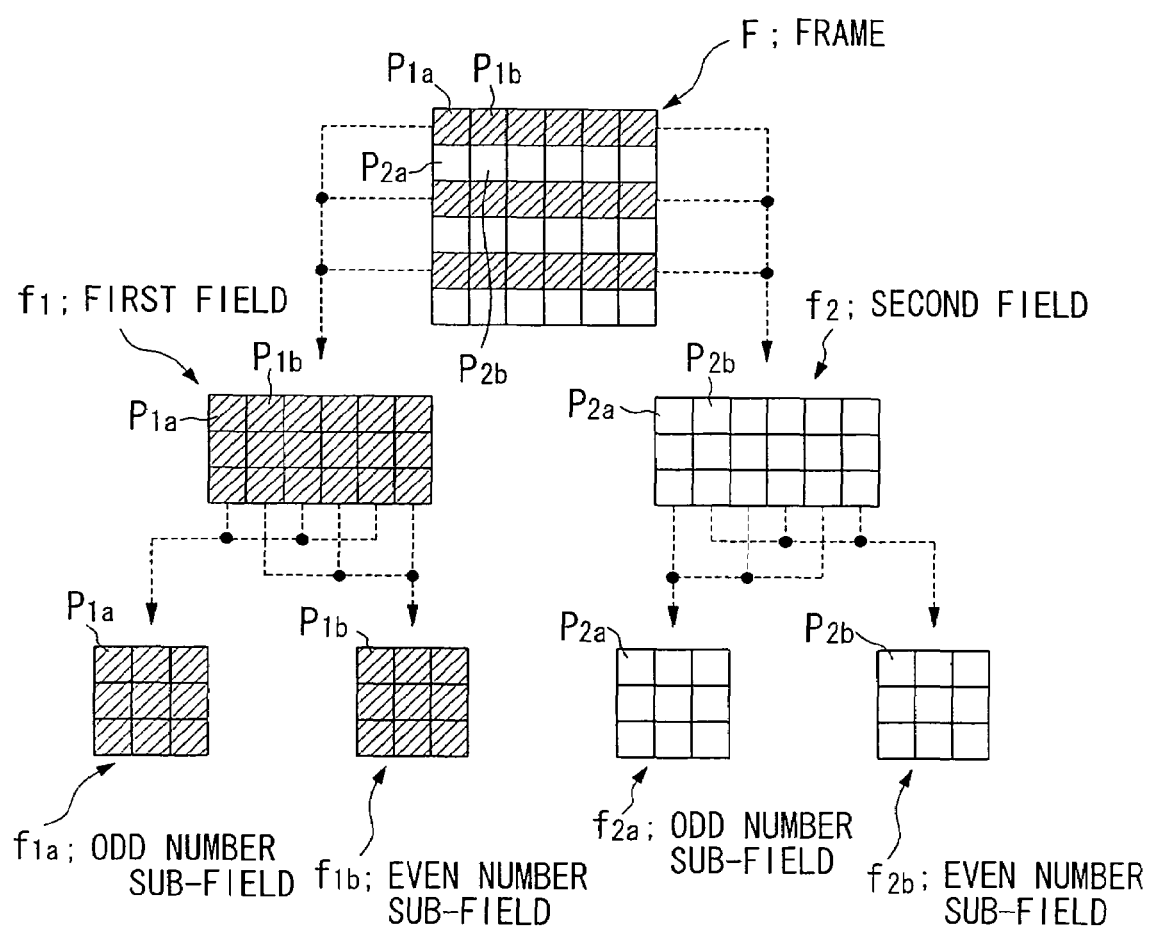
FIG. 13 is an explanatory view for describing the operating principle of the VDT stress mitigating device according to the fourth embodiment of the present invention.
Figure 14:
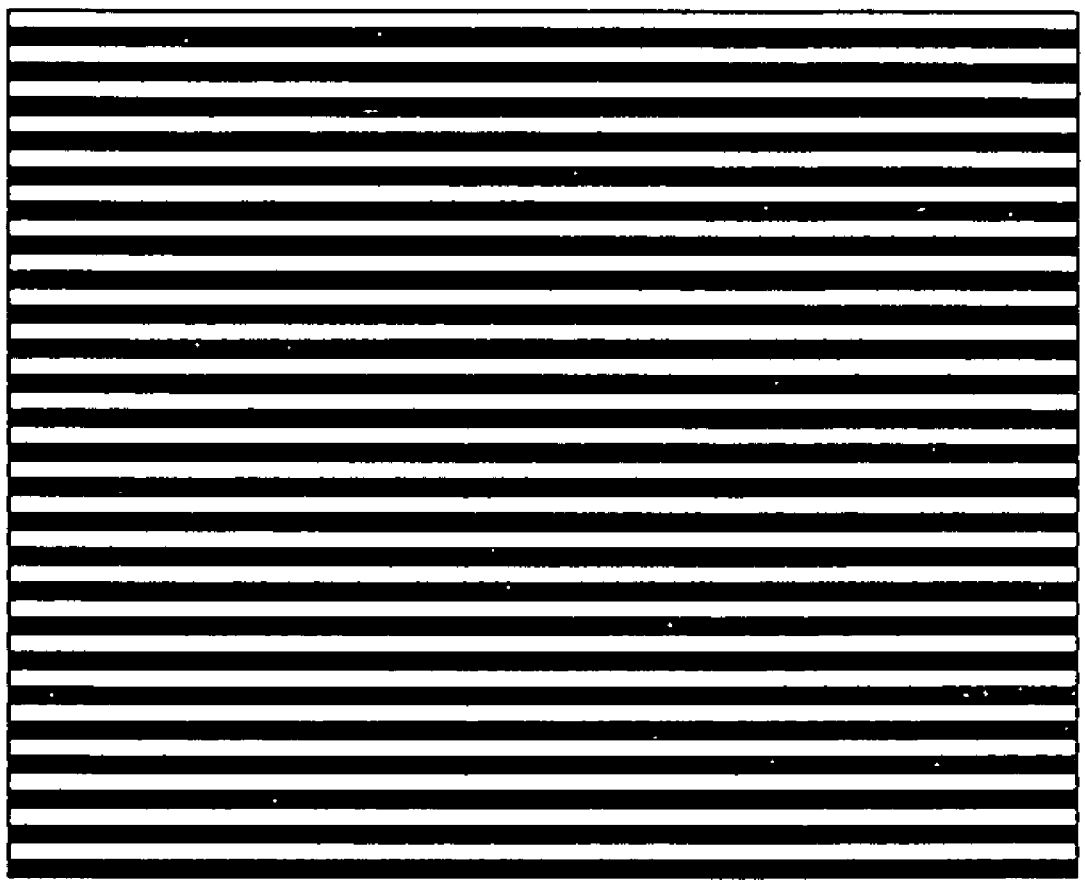
FIG. 14 is a diagram showing an example of a regular spatial pattern (a striped pattern) that causes VDT stress.

This is to say that the fact that no distinction is made between the first field and second field means that the first field and second field are treated as both showing an image on the same hypothetical line. For example, the odd numbered line L11 and the even numbered line L21 in FIG. 13 are treated as the same line, and equivalent lines in the corresponding sequence in each field are regarded in the same way. By not distinguishing between fields in this way, it becomes possible to perform a common temporal filtering process for each of the fields forming one frame.

Next, a supplementary explanation of what is meant by the filter section 20 maintaining the temporal order of each field will be given with reference made to FIG. 4.

Figure 4:
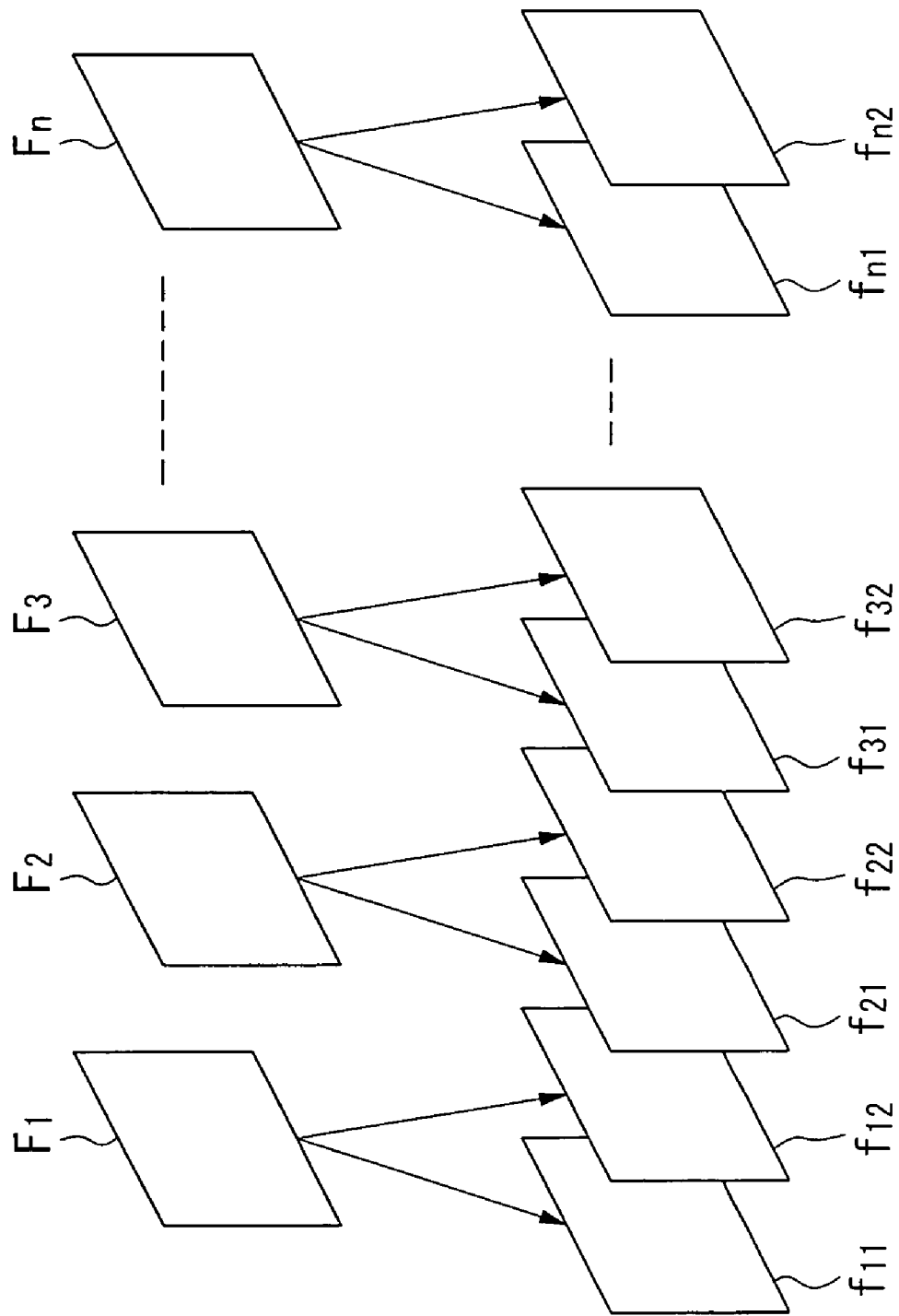
FIG. 4 is an explanatory view for describing the operation of the filter portion (the contents when the temporal sequence is maintained) according to the first embodiment of the present invention.

In FIG. 4, the symbols F1 to Fn (where n=a natural number) represent frames, the symbols f11, f12, ~, fn1, and fn2 represent the field belonging to each frame. Therefore, in an interlaced format, the frames F1 to Fn are scanned according to the temporal order and after the first field has been scanned, the second field is scanned for each frame.

As is shown in the example in FIG. 4, the temporal order of each field is as follows. Specifically, the first field f11 belonging to the leading frame F1, the second field f12 belonging to the same frame F1, the first field f21 belonging to the next frame F2, the second field f22 belonging to the same frame F2, the first field f31 belonging to the next frame F3, the second field f32 belonging to the same frame F3, and so on down to the first field fn1 belonging to the last frame Fn, and the second field fn2 belonging to the same frame Fn2.

In this way, the filter portion 20 does not distinguish between the first field and second field and performs a temporal filtering process on each field in accordance with the above temporal of each field (while maintaining the field temporal order), as is described below.

The temporal filtering process of the filter section 20 will now be described.

The low pass filter 21 provided in the first stage of the filter section 20 calculates by sum of product calculation the field image data $1I_i(t)$ after the temporal filtering process from the image data $I_i(t)$ output from the A/D conversion section 10, using the function $F_\delta$ shown in Formula (1) below.

$$^1I_i(t)=^1F_\delta(I_i(t))=(1-\delta)\times I_i(t)+\delta\times I_i(t-\Delta t) \qquad (1)$$

In Formula (1), i represents the coordinates of pixels within each field image data; $\Delta t$ represents the temporal interval between the two successively input fields and is one 60th of a second when the video signal is in the NTSC format. $\delta$ is a constant that determines the characteristics of the low pass filters and is a constant greater than 0 and less than 1, for example, it may be set as 0.7. As is described below, because of visual blurring that occurs in an image in accordance with this constant $\delta$, $\delta$ is referred to in the description below as the blurring constant.

The image data $^1I_i(t)$ obtained by the low pass filter 21 is transferred as in a sequential pipeline to the second stage and following low pass filters 22, 23, and 24. In the low pass filters of each of these stages, the temporal filtering process using the equivalent function $^1F_\delta$ as for the low pass filter 21 is performed.

When the low pass filter performing the temporal filtering process using the function $^1F_\delta$ connects to the nth stage, the image data $^nI_i(t)$ obtained from the final low pass filter is obtained using the following Formula (2).

$$^nI_i(t)=^nF_\delta(I_i(t))=(1-\delta)\times^{n-1}F_\delta^{i-1}I_i(t))+\delta\times^{n-1}F_\delta^{i-1}I_i(t)) \qquad (1)$$

At this point, the relationship between the above temporal filtering process and VDT stress will be described.

According to Formula (1), the image data $I_i(t)$ from the current field and the image data $I_i(t-\Delta t)$ from the previous field are added after a weighting in accordance with the blurring constant $\delta$ has been applied (a convolution calculation), so that earlier image data is reflected accumulatively relative to the current image data. As a result, the higher frequencies that contain the frequencies of the flicker generated in the interlaced format (i.e. the frame scan frequencies) are attenuated from out of the temporal frequency components of each field image, and flicker in these frequencies is thus suppressed. At this time, visually, blurring is generated in the image between the first field and second field, and the degree of the change in the image between fields is suppressed. Consequently, VDT stress caused by this flicker is mitigated.

Moreover, as described above, in the present embodiment, because a common temporal filtering process is performed on each field without any distinction being made the first field and second field whose line positions are different to each other, as a result of the image data of both the first field and second field being accumulatively reflected together between the fields, a spatial filtering process is also implemented. Therefore, the highest spatial frequency components in a direction orthogonal to the direction of the scan line are attenuated and the degree of spatial changes is suppressed visually. Accordingly, VDT stress caused by regular spatial patterns such as a striped pattern is mitigated.

Note that the highest spatial frequency components in a direction orthogonal to the direction of the scan line correspond, for example, to the pitch of the scan line.

Figure 5:
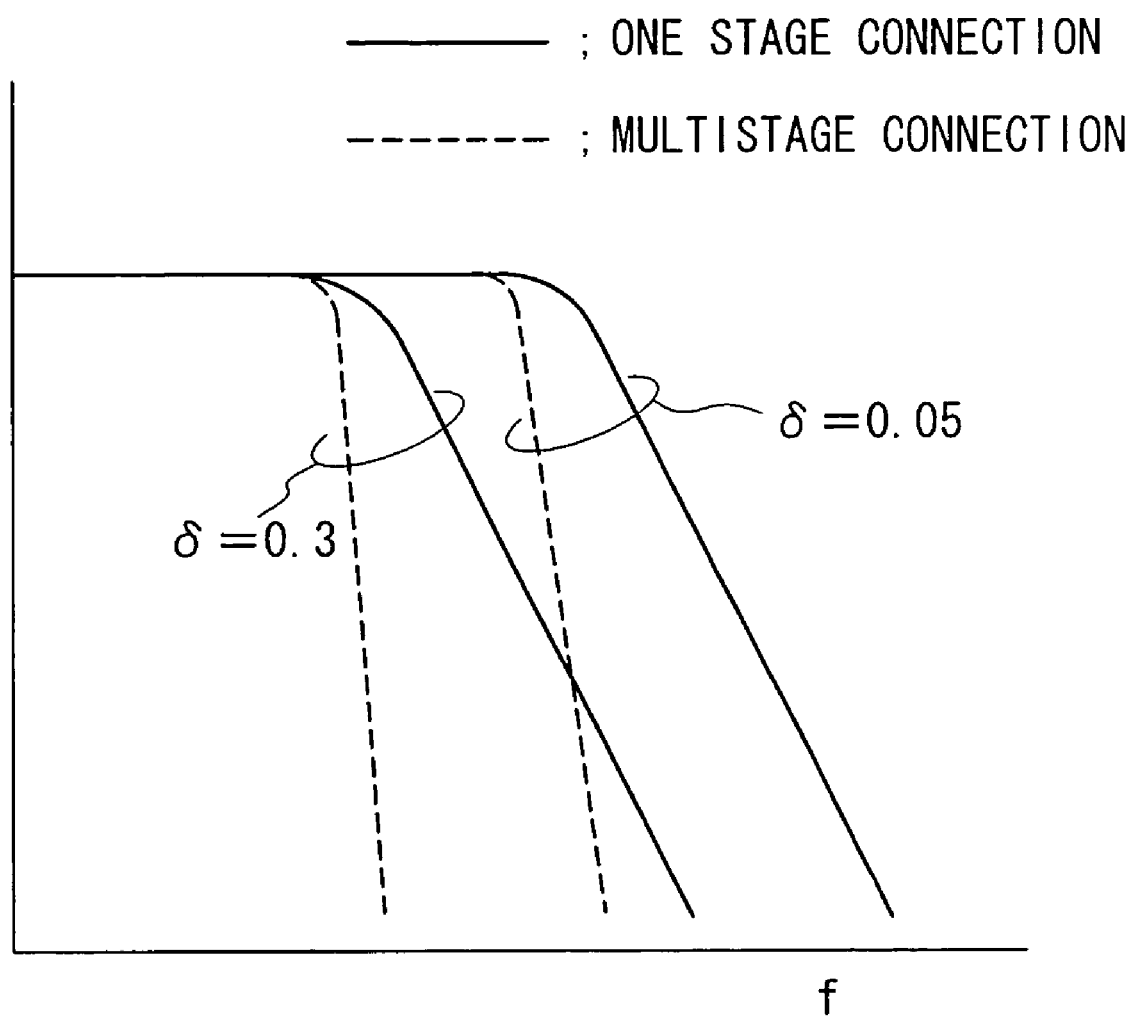
FIG. 5 is a characteristic view for describing the characteristics of the filter portion according to the first embodiment of the present invention.

The relationship between the blurring constant $\delta$ and the filter attenuation characteristics when the low pass filter is connected for one stage and when the low pass filter is connect for several stages is shown in FIG. 5. As is shown in FIG. 5, if the blurring constant $\delta$ is increased, the characteristics move towards the lower frequencies. In order to mitigate VDT stress, it is possible to attenuate the higher frequencies. However, if the higher frequencies are attenuated by increasing the blurring constant $\delta$, then a portion of the useful lower frequencies are sacrificed. In contrast, as is the case with the filter section 20 according to the first embodiment, if the low pass filter is formed in several stages, then as is shown by the broken line in FIG. 5, the selectivity of the filter is improved. As a result, the sacrifice of the lower frequency regions can be kept to a minimum and the higher frequency regions attenuated effectively. This allows the effect imparted to the image quality to be suppressed.

In the manner described above, the filter section 20 performs a temporal filtering process on the image data D1 output from the A/D conversion section 10 and outputs image data D2 in which predetermined frequency components that contribute to VDT stress (such as frame scan frequency components and the highest spatial frequency components in a direction orthogonal to the direction of the scan line) have been attenuated.

Next, the D/A conversion section 30 performs a D/A conversion on the image data D2 obtained from the filter section 20 so that this is converted into interlaced format video signals P2 that are then output. At this time, the D/A conversion section 30 successively converts the image data of each field successively output from the filter section 20 into field analog signals. These are then reconstructed as video signals based on an interlaced format in accordance with the temporal order of each field and are successively output. At this time, for example, video signals of the first field that have been processed ahead of the video signals of the second field by the A/D converter 10 are output ahead of the video signals of the second field in the D/A converter 30, thereby maintaining the temporal order.

As a result of the above, a series of processes are performed on interlaced format video signals output from an external image signal output device in order to mitigate VDT stress. These video signals are then output to an unillustrated image display device.

The effects of the first embodiment are summarized below.

(1) According to the first embodiment, it is possible to attenuate the highest spatial frequency components (for example, the spatial frequency components of regular spatial patterns such as finely striped patterns) in a direction orthogonal to the scan line direction capable of being displayed on an image display device, and it is possible to mitigate content generated VDT stress caused by this type of regular spatial pattern.

(2) Further, it is possible to mitigate content generated VDT stress caused by images having a pattern of equally pitched stripes parallel to a horizontal scan line, that is, by flicker generated in a temporal frequency half the frame frequency when a striped pattern is displayed.

(3) Further, it is possible to also attenuate temporal frequency components of approximately 10 Hz contained in the graphic content, and to also mitigate VDT stress caused by images flickering in a frequency of approximately 10 Hz.

(4) Further, it is possible to suppress the amount of memory required to store the image data in each low pass filter to half that when the processing is performed in frame units by performing the temporal filtering process in field units.

Note that, in the first embodiment, the blurring constant δ was set in common for the low pass filters 21, 22, 23, and 24 forming the filter section 20. However, it is also possible to employ a different blurring constant for each low pass filter.

Moreover, in the first embodiment, the number of low pass filter stages in the filter section 20 was set at four. However, the number of stages may be reduced to three or less, or may be increased to five or more. In addition, the number of low pass filter stages and the blurring constant δ may be set appropriately, in accordance with the necessary filter characteristics.

Furthermore, in the first embodiment, the VDT stress mitigating device was installed between an image signal output device such as a video tuner or the like and an image display device such as a video monitor or the like. However, the present invention is not limited to this, and the image signal output device and image display device may be integrated as a single device. Moreover, the image signal output device is not limited to a video tuner and any device that outputs an interlaced scan format analog video signal in NTSC, PAL, or the like, for example, a video tape playback device, a laser disk playback device, or a TV game device may be used. In addition, any device may be used as the image display device provided that it receives interlaced scan format analog video signals as input signals.

Furthermore, in the first embodiment, analog quantity video signals P1 are converted into digital quantity image data D1 by the A/D converter 10, and digital quantity image data D2 is converted into analog quantity video signals P2 by the D/A converter 30. However, if a device for inputting and outputting digital image signals is connected, the A/D conversion function of the A/D conversion section 10 and the D/A conversion function of the D/A conversion section 30 are not needed, and a structure may be formed in which image data from the first field and the second field is input in time series order and a filtering process is performed in the same way by the common filter section 20.

Furthermore, in the first embodiment, the field image data $^1 I_f(t)$ was calculated after the temporal filtering process from the image data $I_f(t)$ of the current field and the image data $I_f(t-\Delta t)$ from the previous field by each low pass filter forming the filter section 20. However, the present invention is not limited to this. This means that it is also possible to perform the temporal filtering process while considering the image data from the field prior to that. In this case, by selecting the weighting coefficient for the image data belonging to each field, it becomes possible to finely control the filter characteristics and to set even more appropriate filter characteristics.

§ 2. Second Embodiment

The second embodiment of the present invention will be described next.

The second embodiment deals with a VDT stress risk quantifying device for quantifying and detecting the risk of VDT stress caused by images based on an interlaced format such as NTSC or PAL.

Figure 6:
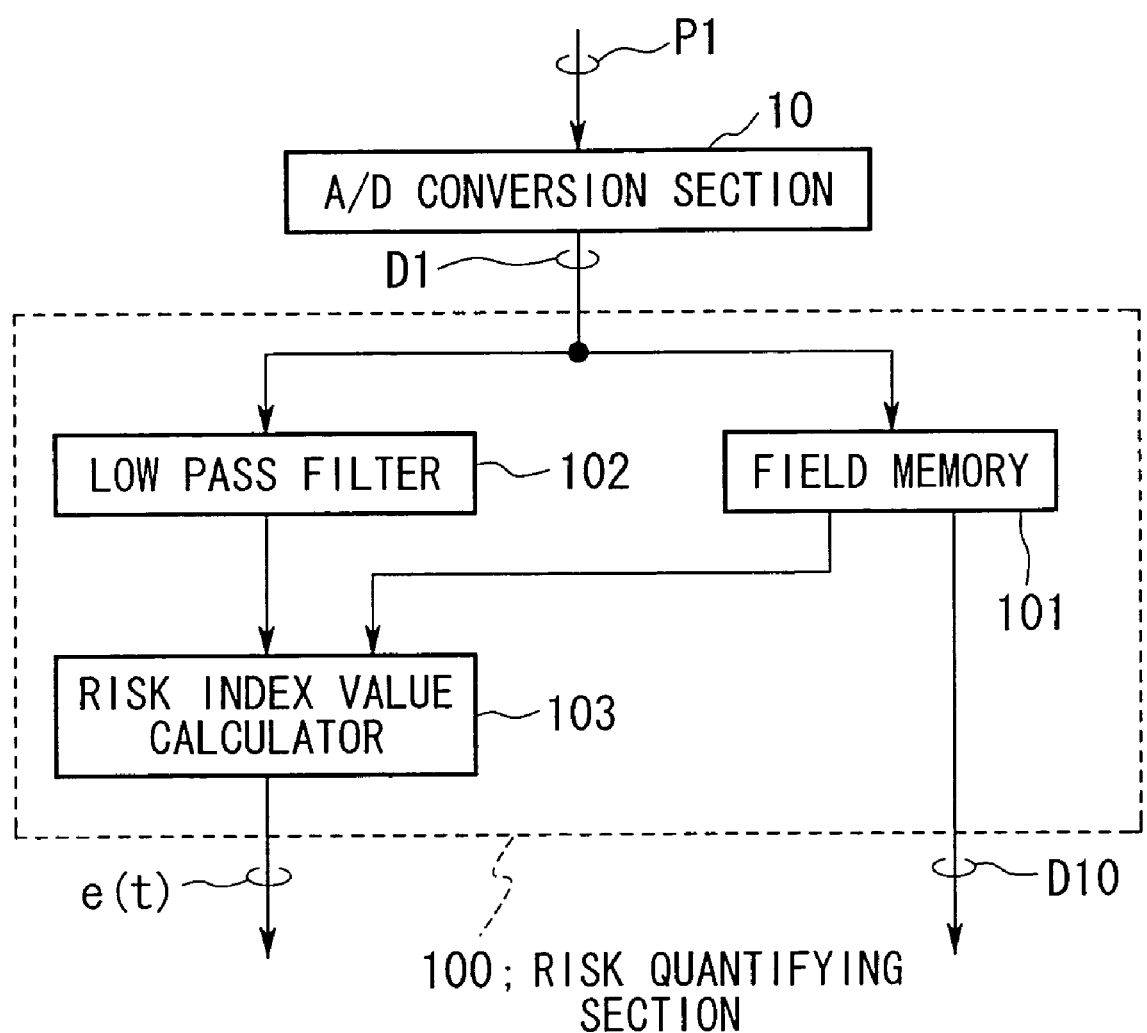
FIG. 6 is a block diagram showing the structure of the VDT stress risk quantifying device according to the second embodiment of the present invention.

FIG. 6 shows the structure of the VDT stress risk quantifying device according to the second embodiment. In FIG. 6, the symbol 10 refers to an A/D conversion section. The A/D conversion section 10 sequentially imports from the outside in field units analog quantity video signals P1 based on an interlaced format and converts these into image data D1 by A/D conversion.

The symbol 100 refers to a risk quantifying section forming the feature portion of the VDT stress risk quantifying device according to the second embodiment. The risk quantifying section 100 comprises: field memory 101 for importing the image data D1 of a single field and temporarily holding it; a low pass filter 102 for performing a temporal filtering process on the image data D1; and a risk index calculator 103 for calculating a risk index value e(t) using both sets of image data from before and after the temporal filtering process.

Next, the operation of the VDT stress risk quantifying device according to the second embodiment will be described according to the flow of the routine shown in FIG. 7.

First, in step S10, the A/D conversion section 10 sequentially imports analog quantity video signals P1 in an interlaced format from an unillustrated external image signal output device, quantizes these with fields as units, and performs A/D conversion so that the video signals of each field are converted into digital quantity image data D1. The image data D1 is then transferred to the risk quantifying section 100.

Next, in step S11, the field memory 101 sequentially imports the image data D1 of one field that has been converted by the A/D conversion section 10 and temporarily holds it. The contents of the field memory 101 are sequentially updated to the image data of the new field imported from the A/D conversion section 10.

Next, in step S12, in the risk quantifying section 100 to which the image data D1 has been transferred, the low pass filter 102 of the risk quantifying section 100 performs a temporal filtering process on the image data D1. At this time, the low pass filter 102 functions in the same way as, for example, the low pass filter 21 according to the first embodiment. That is, the low pass filter 102 performs a temporal filtering process while maintaining the temporal order of each field without distinguishing between the first field and second field forming one frame. As a result, predetermined frequencies contained in the image formed by the image data D1 are attenuated.

Next, in step 13, the risk index calculator 103 receives the image data from the low pass filter 102 after the image data has undergone the temporal filtering process, and also reads from the field memory 101 the image data that corresponds to this image data before the temporal filtering process. The risk index value e(t) is calculated using Formula (3) below, based on the difference between the image data before the temporal filtering process and the image data after the temporal filtering process.

$$e(t) = \frac{\sum_c \sum_i w_c |I_i(t) - {}^l I_i(t)|^m}{N \times (L\max)^m \times \sum_c w_c} \quad (3)$$

In this case, $w_c$ represents the loads $w_R$, $w_G$, and $w_B$ for each of the color components R (red), G (green), and B (blue), and is set as, for example, $w_R=w_G=w_B=1.0$. Imax is the maximum value of the image data in each pixel of the field, and, for example, is set as 255 when the data of each pixel is expressed in 8 bit. N represents the total number of the image data of a single field (i.e. the total number of pixels in a single field), and when a single frame comprises 640×480 pixels, for example, the total number N of the image data of a single field is set as 153600 (=640×240). m is an index for expressing the non-linearity of the human sensitivity to the risk of VDT stress, and any one of, for example, 1, 2, or 3 may be set as the index m.

In Formula (3), by setting the load in accordance with each of the color components R, G, and B, the risk is quantified in accordance with the difference in color in the image. Generally, red is most likely to cause VDT stress. Therefore, the loads $w_R$, $w_G$, and $w_B$ are set appropriately such that, compared with the other colors, red is sizably reflected in the risk index value e(t). Moreover, by normalizing using the total number N of the image data, the effect on the risk index value e(t) of any differences in the size and the like of the screens of the display devices is eliminated, and it is possible to determine the risk of VDT stress in an image on any screen based on the same standard.

Note that, in Formula 3, time is required in the calculation because of the floating point arithmetic calculation for the term $\Sigma w_c |I_i(t) - {}^l I_i(t)|^m$. Therefore, values that can be set for this term are calculated in advance and set in table form. When the risk index e(t) is calculated, if it is possible to acquire values for this term by referring to this table, then the time needed for the calculation of the risk index value e(t) can be effectively shortened.

As described above, the risk index calculator 103 determines the difference before and after the temporal filtering process by setting a load in accordance with R, G, and B for all of the pixels on a screen using the above formula (3). The risk index e(t) is then calculated by normalizing this difference using the total number N of image data of a single field, the maximum value $I_{max}$ of the image data, and the load $w_c$.

Note that, in the second embodiment, the field memory 101 imports the image data D1 from the A/D conversion section 10, and sequentially outputs it together with the risk index value e(t) to the outside as image data D10. As a result, as in the third embodiment described below, it is possible to reflect the risk index value e(t) and provide the necessary information to the device that performs the temporal filtering process in the image signal.

The effects of the second embodiment are summarized below.

(1) According to the second embodiment, it is possible to quantify and detect the risk of content generated VDT stress caused by regular spatial patterns having the highest spatial frequency components (for example, the spatial frequency components of regular spatial patterns such as finely striped patterns) in a direction orthogonal to the scan line direction capable of being displayed on an image display device.

(2) Further, it is possible to quantify and detect the risk of content generated VDT stress caused by images having a pattern of equally pitched stripes parallel to a horizontal scan line, that is, by flicker generated in a temporal frequency half the frame frequency when a striped pattern is displayed.

(3) Further, it is possible to also attenuate temporal frequency components of approximately 10 Hz contained in the graphic content, and to also quantify and detect the risk of VDT stress caused by images flickering in a frequency of approximately 10 Hz.

(4) Further, it is possible to suppress the amount of memory required to store the image data in the low pass filter 102 to half that when the processing is performed in frame units by performing the temporal filtering process in field units.

Note that, in the second embodiment, the one stage low pass filter 102 was employed. However, it is also possible to increase the number of stages to two or more, and it is also possible to appropriately set the number of low pass filter stages in accordance with the necessary filter characteristics. In this case, either a common blurring constant δ may be employed for each low pass filter, or a different blurring constant may be employed for each filter. It is also possible to select each blurring constant δ in accordance with the necessary filter characteristics.

Moreover, in the second embodiment, analog quantity video signals P1 are converted into digital quantity image data D1 by the A/D converter 10. However, if a device for outputting digital image signals is connected, the A/D conversion function of the A/D conversion section 10 is not needed, and a structure may be formed in which image data from the first field and the second field is input in time series order and a filtering process is performed in the same way by the common filter section 20.

Furthermore, in the second embodiment, the field image data ${}^l I_i(t)$ was calculated after the temporal filtering process from the image data $I_i(t)$ of the current field and the image data $I_i(t-\Delta t)$ from the previous field by the low pass filter 102. However, the present invention is not limited to this. That is, it is also possible to perform the temporal filtering process while considering the image data from the field prior to that. In this case, by selecting the weighting coefficient for the image data belonging to each field, it becomes possible to finely control the filter characteristics and to calculate the risk index value e(t) even more appropriately.

§ 3. Third Embodiment

The third embodiment of the present invention will be described next.

In the third embodiment of the present invention, the functions of the risk quantifying device of the second embodiment are given to the VDT stress mitigating device according to the first embodiment, thereby allowing the risk index value e(t) to be reflected in the blurring constant δ, and enabling the filter characteristics to be appropriately controlled in accordance with the degree of risk of VDT stress.

Figure 8:
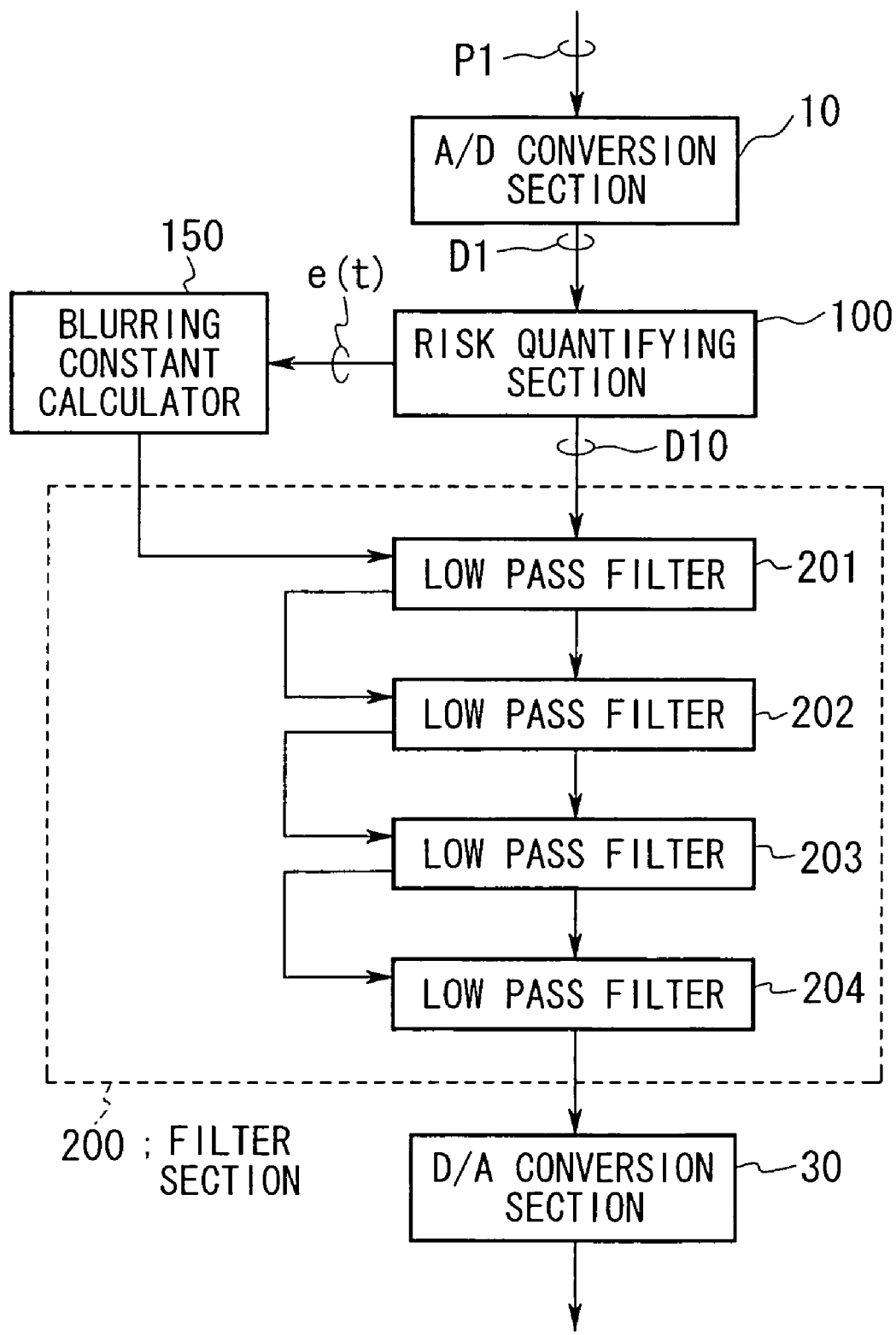
FIG. 8 is a block diagram showing the structure of the VDT stress mitigating device according to the third embodiment of the present invention.

The structure of the VDT stress mitigating device according to the third embodiment is shown in FIG. 8. In FIG. 8, the symbol 10 denotes an A/D conversion section the same as that described in the first embodiment. The A/D conversion section 10 converts interlaced format image signals P1 into image data D1 by A/D conversion and then outputs the image data D1. The symbol 100 denotes a risk quantifying section having the same structure as that described in the second embodiment (see FIG. 6). The risk quantifying section 100 quantifies the risk of VDT stress as a risk index value e(t). The symbol 150 denotes a blurring constant calculator for calculating a blurring constant δ used in the temporal filtering process. The blurring constant calculator 150 reflects the risk index value e(t) as it calculates the blurring constant δ.

The symbol 200 denotes a filter section comprising low pass filters 201 to 204 connected in multistage. The filter section 200 performs a temporal filtering process on the image data D1 using a blurring constant obtained from the blurring constant calculator 150. The symbol 30 denotes a D/A conversion section the same as that described in the first embodiment. The D/A conversion section 30 performs a D/A conversion on the image data D2 that has undergone the temporal filtering process so as to convert it into a video signal P2 based on an interlaced format.

Figure 9:
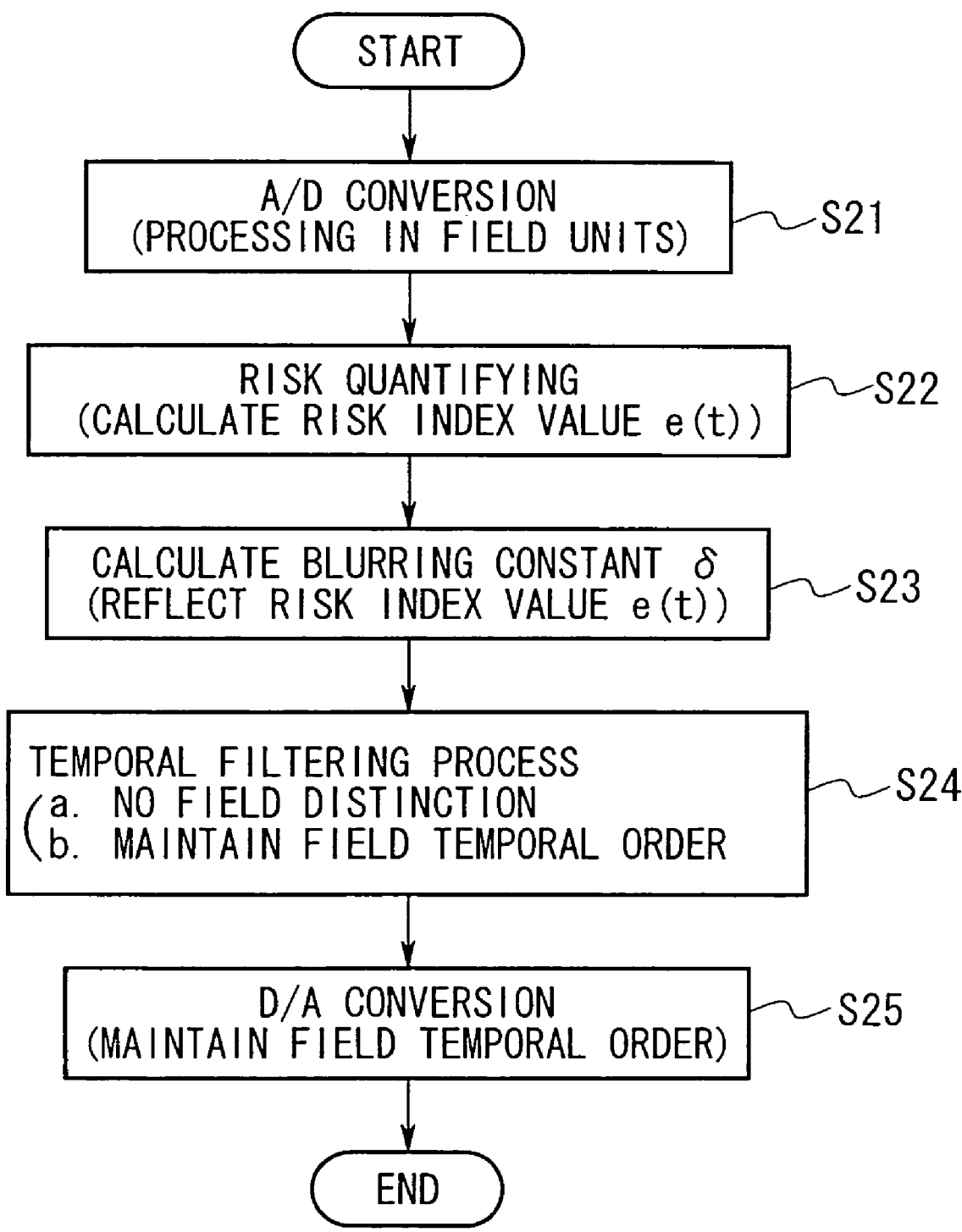
FIG. 9 is a flow chart showing the flow of operation of the VDT stress mitigating device according to the third embodiment of the present invention.

Next, the operation of the VDT stress mitigating device according to the third embodiment will be described according to the flow of the routine shown in FIG. 9.

First, in step S21, the A/D conversion section 10 sequentially imports analog quantity video signals P1 in an interlaced format from an unillustrated external image signal output device, quantizes these with fields as units, and performs A/D conversion so that the video signals of each field are converted into digital quantity image data D1. The image data D1 is then transferred to the filter section 30.

Figure 7:
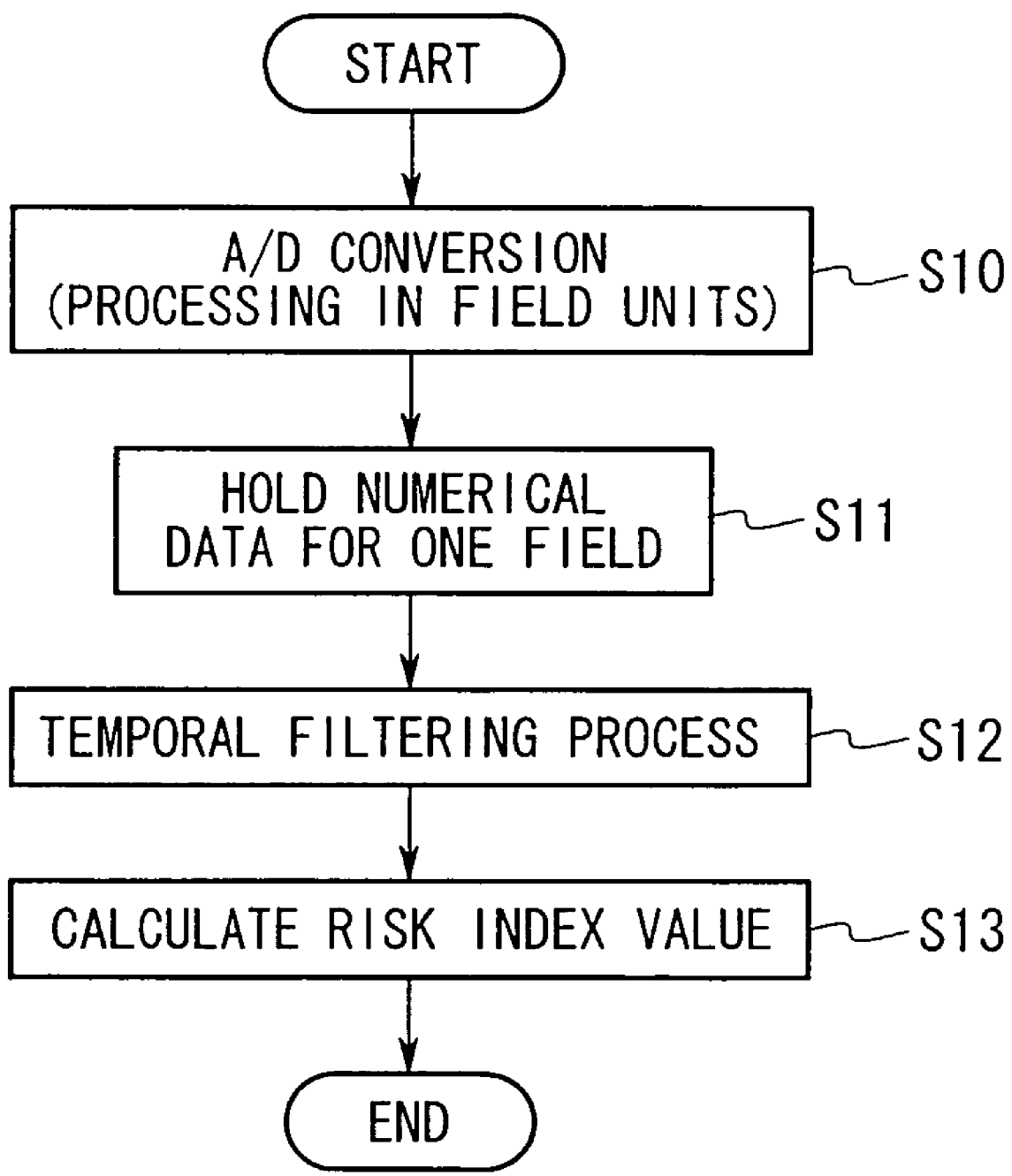
FIG. 7 is a flow chart showing the flow of operation of the VDT stress risk quantifying device according to the first embodiment of the present invention.

Next, in step S22, as was described in the second embodiment, the risk quantifying section 100 calculates the risk index e(t) by performing the steps S11 to S13 shown in FIG. 7, and also holds the image data D1 of one field imported from the A/D conversion section 10 and outputs this as image data D10. The risk index value e(t) is transferred to the blurring constant calculator 150.

Next, in step S23, the blurring constant calculator 150 calculates the blurring constant δ (t) from the risk index value e(t) transferred from the risk quantifying section 100. At this point, if the risk index value e(t) is smaller than a preset lower limit threshold value $e_{LOW}$, the value of the blurring constant δ is taken as 0. If the risk index value e(t) is greater than a preset upper limit threshold value $e_{HIGH}$, the value of the blurring constant δ is taken as the maximum value $δ_{max}$ described below. If the risk index value e(t) is between the lower limit threshold value $e_{LOW}$ and the upper limit threshold value $e_{HIGH}$, the value is determined from Formula (4) below, for example. In this case, $δ_{max}$ is set as the upper limit value that can be reached by the blurring constant δ, and is a value greater than 0 and less than 1, for example, 0.7.

$$\delta(t) = G(e(t)) = \frac{\delta \max}{2} \times \left[1 + \tanh\left\{4\left(\frac{e - e_{LOW}}{e_{HIGH} - e_{LOW}} - 0.5\right)\right\}\right] \quad (4)$$

Figure 10:
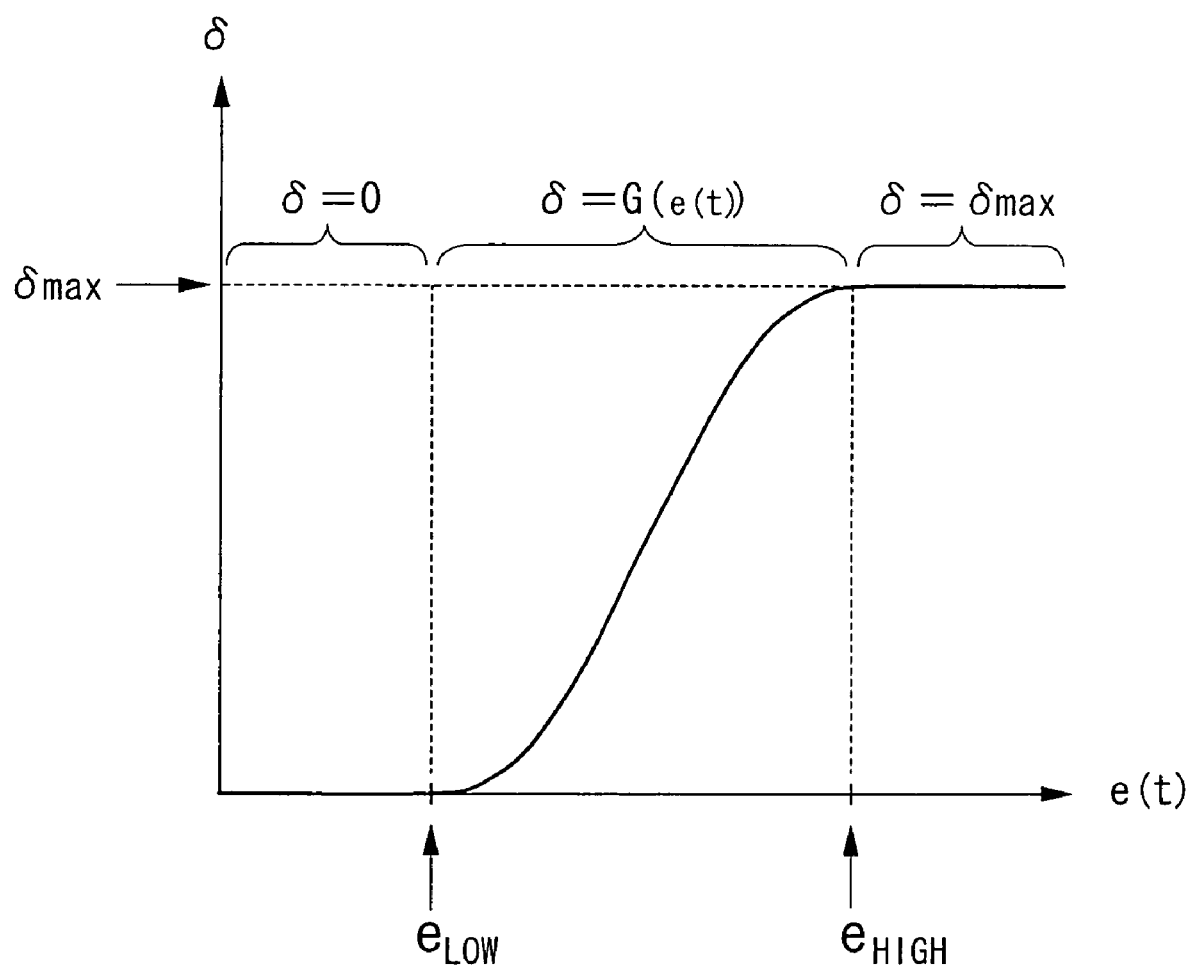
FIG. 10 is a diagram showing the blurring constant calculated by the blurring constant calculator according to the third embodiment of the present invention.

The relationship between the risk index value e(t) and the blurring constant δ (t) is shown in FIG. 10. As is shown in FIG. 10, when the risk index value e(t) is smaller than the lower limit threshold value $e_{LOW}$, the blurring constant δ (t) is taken as 0. As a result, the filter section 200 outputs the image data D1 as image data D2 without actually performing a filtering process on the image data D1. Because there is little possibility of VDT stress being caused when the risk index value e(t) is small like this, the blurring constant δ is taken as 0 thereby giving priority to the quality of the image.

When, on the other hand, the risk index value e(t) is greater than the upper limit threshold value $e_{HIGH}$, the blurring constant δ (t) is taken as the maximum value $δ_{max}$ (for example, 0.7). As a result, the filter section 200 performs a filtering process on the image data D1 using the maximum value $δ_{max}$. Because there is a strong possibility of VDT stress being caused when the risk index value e(t) is large like this, the blurring constant δ (t) is taken as the maximum value $δ_{max}$ and the temporal filtering process is performed. However, if the blurring constant δ (t) is too large, the quality of the image cannot be maintained. Therefore, the blurring constant δ (t) takes the maximum value $δ_{max}$ as its upper limit so that the necessary image quality can be maintained. Moreover, when the risk index value e(t) is between the lower limit threshold value $e_{LOW}$ and the upper limit threshold value $e_{HIGH}$, the blurring constant δ (t) is set as a value between 0 and the maximum value $δ_{max}$ according to Formula (4).

Thus, the blurring constant δ (t) is calculated in this way such that the risk index value e(t) is reflected therein.

The blurring constants δ (t) may be calculated in advance using Formula (4) and formed into a table for the risk index values e(t) that are likely to be output from the risk quantifying section 100. It is thus possible to acquire the blurring constant δ (t) by referring to this table, based on the risk index values e(t) output from the risk quantifying section 100. Accordingly, the load needed for the blurring constant δ (t) calculation process can be reduced, and the blurring constant calculation time can be shortened.

The blurring constant δ (t) determined in the blurring constant calculator 150 is transferred to the filter section 200 together with the image data D10 (i.e. $I_i(t)$) of the original image from the field memory 101 of the risk quantifying section 100. At this time, the image data D10 is temporally latched in an appropriate manner by the field memory 101 of the risk quantifying section 100, and the timing thereof is matched with that of the blurring constant δ and transferred to the filter section 200.

Next, in step S24, in the same way as the filter section 20 according to the first embodiment, the filter section 200 performs a temporal filtering process on the image data D10 transferred from the risk quantifying section 100 without distinguishing between the first fields and second fields and while maintaining the temporal order of each field. However, while the filter section 20 according to the first embodiment performs the temporal filtering process using a preset blurring constant , the filter section 200 according to the third embodiment performs the temporal filtering process using blurring constants δ (t) successively transferred from the blurring constant calculator 150.

In this case, in the filter section 200, a blurring constant δ (t) used in the low pass filtering process at the nth stage is transferred to the next low pass filter together with the field image $^nF_δ(I_i(t))$ resulting from that process, and the low pass filtering process for the same original image data is performed using the same blurring constant δ (t).

In the next step S25, the D/A conversion section 30 performs a D/A conversion such that the image data D2 obtained from the filter section 200 is converted into an interlaced format video signal P2 and is then output.

As a result, a series of processes in order to mitigate VDT stress are performed on interlaced format video signals output from an external image signal output device, and the signals are then output to an unillustrated image display device.

According to the third embodiment, the following effects are obtained in addition to the effects of the above first embodiment.

(1) Because the risk index value e(t) representing the risk of VDT stress is reflected in the blurring constant δ (t) used in the temporal filtering process, temporal filtering process can be adapted to the level of risk and its effects on the image quality can be kept to a minimum.

(2) Because a blurring constant δ (t) and image data corresponding to each other are transferred to the low pass filter at each stage as a group, processing that matches the risk index value of each set of image data is performed by each low pass filter.

Note that, in the third embodiment, a blurring constant δ (t) is transferred with the corresponding image data through sequential low pass filters. However, it is also possible, for example, to directly output the blurring constants δ (t) to each low pass filter 201 to 204 from the blurring constant calculator 150, and to alter simultaneously the blurring constants of each low pass filter stage each time the blurring constants δ (t) output from the blurring constant calculator 150 are updated.

Moreover, in the third embodiment, the number of low pass filter stages in the filter section 200 was set at four. However, the number of stages may be reduced to three or less, or may be increased to five or more. In addition, the number of low pass filter stages may be set appropriately, in accordance with the necessary filter characteristics.

In addition, in the third embodiment, analog quantity video signals P1 are converted into digital quantity image data D1 by the A/D converter 10, and digital quantity image data D2 is converted into analog quantity video signals P2 by the D/A converter 30. However, as was described in the first embodiment, these conversion functions can be omitted where necessary.

Furthermore, as was described in the first embodiment, it is also possible to perform the temporal filtering process using data extending over three or more fields.

§ 4. Fourth Embodiment

Next, the fourth embodiment of the present invention will be described.

The VDT stress mitigating device according to the fourth embodiment divides one field into a sub-field comprising odd number columns and a sub-field comprising even number columns and performs the temporal filtering process while for each sub-field.

Figure 11:
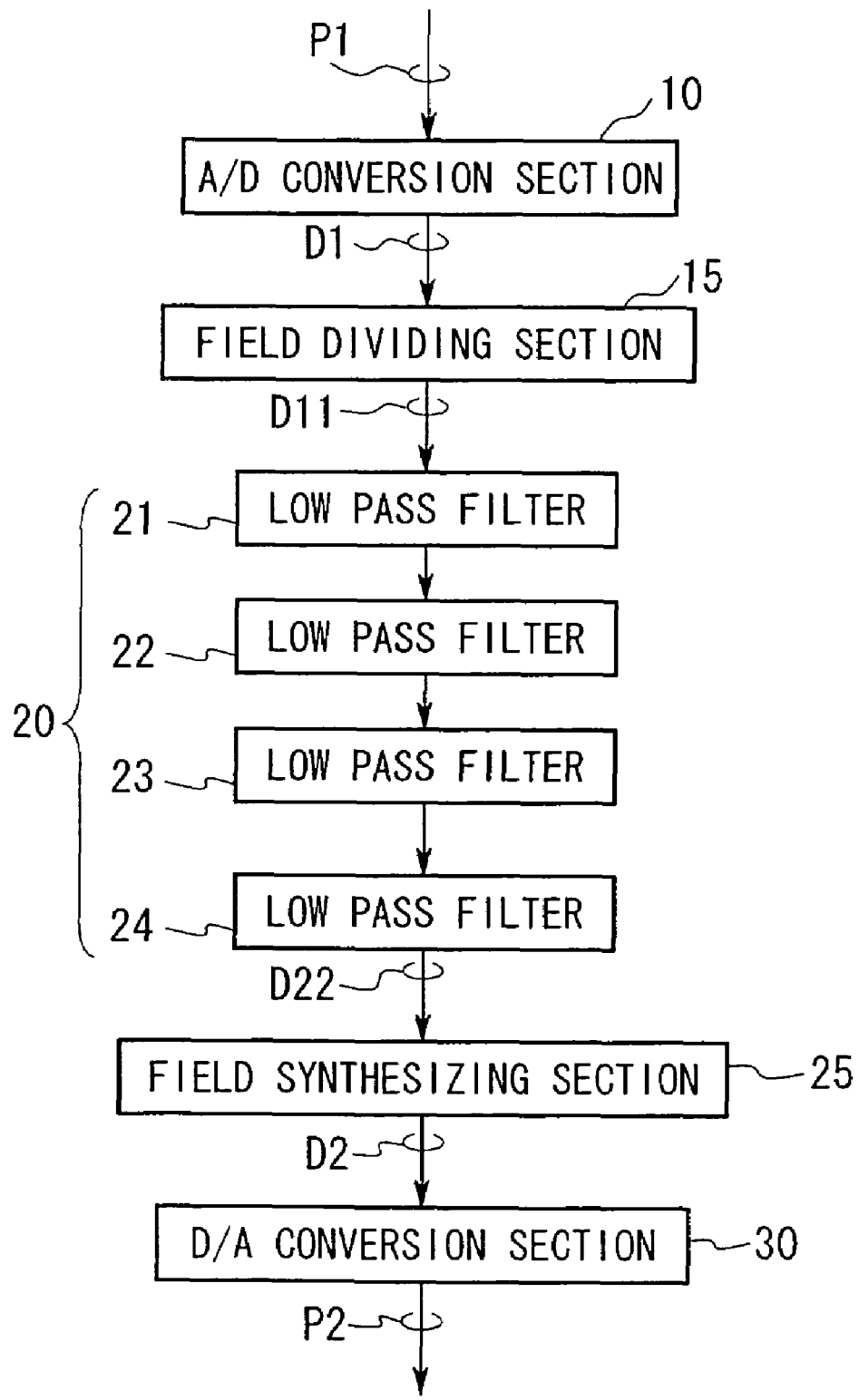
FIG. 11 is a block diagram showing the structure of the VDT stress mitigating device according to the fourth embodiment of the present invention.

FIG. 11 shows the structure of the VDT stress mitigating device according to the fourth embodiment.

As is shown in FIG. 11, in the structure according to the first embodiment shown in FIG. 1, the VDT stress mitigating device according to the fourth embodiment is further provided with a field dividing section 15 between the A/D conversion section 10 and the filter section 20, for dividing each field into a sub-field comprising an odd number column (referred to below as an odd number sub-field) and a sub-field comprising an even number column (referred to below as an even number sub-field). The VDT stress mitigating device according to the fourth embodiment is also provided with field synthesizing section 25 between the filter section 20 and the D/A conversion section 30 for synthesizing each field from the sub-fields.

Figure 12:
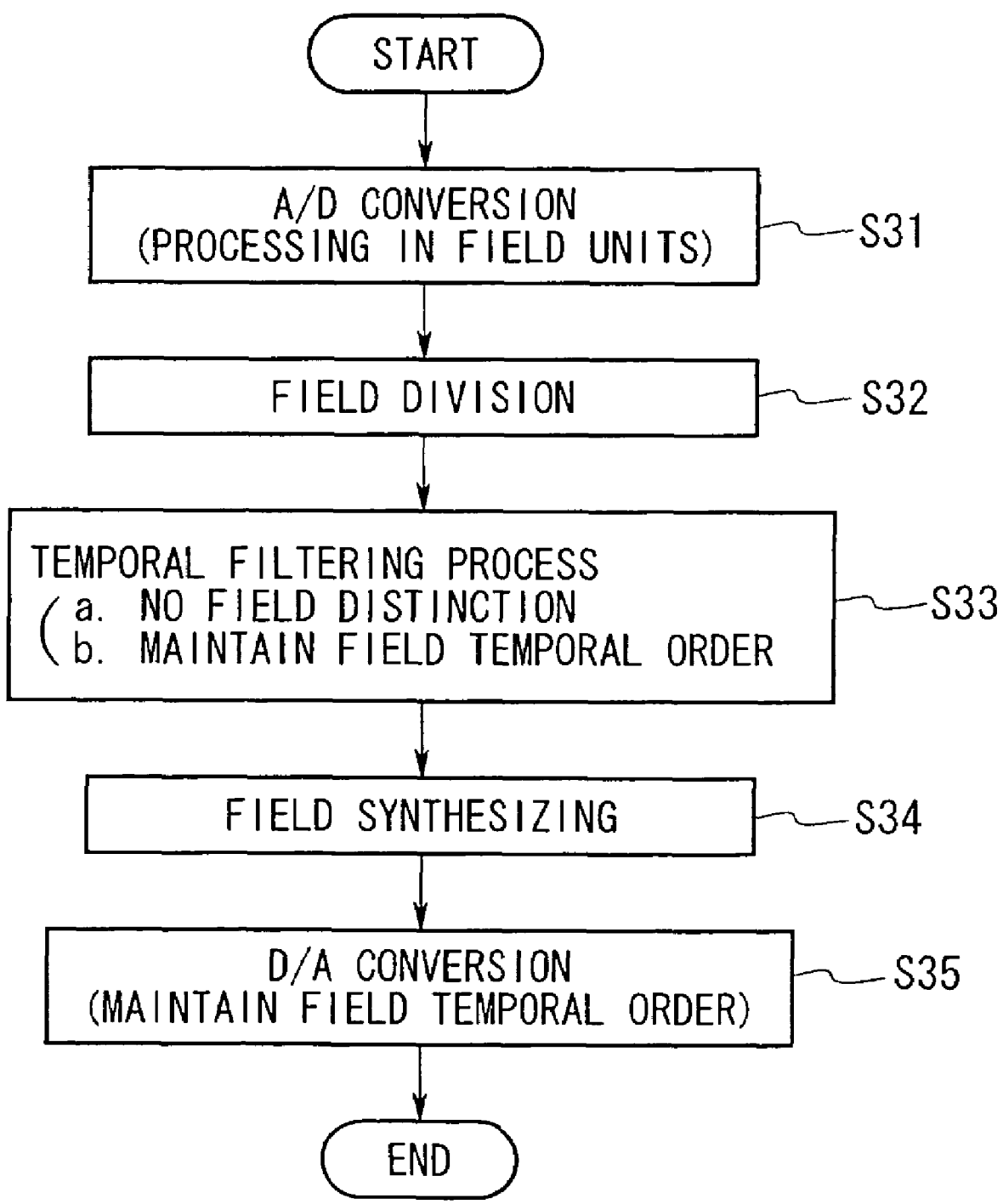
FIG. 12 is a flow chart showing the flow of operation of the VDT stress mitigating device according to the fourth embodiment of the present invention.

Next, the operation of the VDT stress mitigating device according to the fourth embodiment will be described according to the flow of the routine shown in FIG. 12.

First, in step S31, the A/D conversion section 10 sequentially imports analog quantity video signals P1 in an interlaced format from an unillustrated external image signal output device, quantizes these with fields as units, and performs A/D conversion so that the video signals of each field are converted into digital quantity image data D1. The image data D1 of each field is then transferred to the field dividing section 15.

Next, in step S32, the field dividing section 15 divides the image data D1 of each field into an odd number sub-field and an even number sub-field. This field dividing is performed by sampling every second pixel on each line. The field dividing section 15 takes an odd number sub-field and an even number sub-field as a pair, and sequentially outputs to the filter section 20 the image data D11 of each sub-field at a temporal frequency twice the temporal frequency of the field.

Next, in step S33, in the same way as in the above first embodiment, the filter section 20 performs a temporal filtering process on the image data D11 of each sub-field divided by the field dividing section 15 without distinguishing between sub-fields belonging respectively to the first fields and second fields and while maintaining the temporal order of each sub-field. As a result the image data D22 is generated.

At this stage, the corresponding relationship between the pixels in each sub-field and the pixels in each frame in the temporal filtering process will be described with reference made to FIG. 13.

In the example shown in FIG. 13, the first field f1 forming the frame F is divided into an odd number sub-field f1a and an even number sub-field f1b. In the same way, the second field f2 forming the frame F is divided into an odd number sub-field f2a and an even number sub-field f2b. Specifically, each field forming the frame F is divided in layers so that the frame F is divided into the four sub-fields f1a, f1b, f2a, and f2b. The image data D11 of these sub-fields is transferred to the filter section 20.

Note that, in the fourth embodiment, the temporal order of each sub-field in each frame is in the order f1a→f1b→f2a→f2b. However, at the limit where the temporal order of the first field and second field can be maintained, the temporal order of the sub-field within one frame can be settled in any manner.

The pixels P1a, P1b, P2a, and P2b within the frame F shown in FIG. 13 will now be looked at. The pixels P1a and P1b belong to the first field and are contiguous to each other. The pixels P1b and P2b belong to the second field and are contiguous to each other. Moreover, the pixels P1a and P1b and the pixels P2a and P2b belong to lines that are contiguous to each other. Further, the pixels P1a and P2a belong to the odd number column, while the pixels P2a and P2b belong to the even number column.

Because, at present, there is no distinction made between the first field and second field, in this case, the pixels P1a and P1b that belong to the first field and the pixels P2a and P2b that belong to the second field correspond to each other. Moreover, as a result of the dividing of the first field, the pixels P1a that belong to the odd number sub-field f1a and the pixels P1b that belong to the even number sub-field f1b correspond to each other. As a result of the dividing of the second field, the pixels P2a that belong to the odd number sub-field f2a and the pixels P2b that belong to the even number sub-field f2b correspond to each other. Specifically, these four pixels are pixels of positions that correspond to each other on undistinguished sub-fields.

A temporal filtering process is performed on the pixels P1a, P1b, P2a, and P2b that correspond to each other in the above temporal order (f1a→f1b→f2a→f2b). Specifically, first, the respective image data of the pixel P1a and the pixel P1b are set as the subjects of the temporal filtering process using the above Formulas (1) and (2). Because the pixels P1*a* and P1*b* are pixels on adjacent columns on the same line in the first field, the frequency components in the horizontal direction of the screen of the first field are attenuated by this process, and blurring is generated in the horizontal direction.

Next, the respective image data of the pixel P1*b* and the pixel P2*a* are set as the subjects of the temporal filtering process using the above Formulas (1) and (2). Because the pixels P1*b* and P2*a* are pixels on adjacent lines, the frequency components in the vertical direction of the screen are attenuated by this process, and blurring is generated in the vertical direction.

Next, the respective image data of the pixel P2*a* and the pixel P2*b* are set as the subjects of the temporal filtering process using the above Formulas (1) and (2). Because the pixels P2*a* and P2*b* are adjacent pixels on the same line in the second field, the frequency components in the horizontal direction of the screen of the second field are attenuated by this process, and blurring is generated in the horizontal direction.

Next, the last pixel P2*b* is set as the object of the temporal filtering process using the above Formulas (1) and (2) together with the pixel p1*a* belonging to the first field of the next frame. The above pixels P1*a*, P1*b*, P2*a*, and P2*b* are then set as repeating units for processing and the same temporal filtering process is then performed on each of these pixels.

Moreover, this processing that is performed with the pixels P1*a*, P1*b*, P2*a*, P2*b* of each sub-field as repeating units is performed in parallel for all the pixels in each sub-field and is a series of temporal filtering processes that is performed over the total screen.

The image data D22 obtained by performing a temporal filtering process on the image data D11 of each sub-field in this way is transferred to the field synthesizing section 25.

Next, in step S34, the field synthesizing section 25 follows a procedure that is the reverse of the dividing procedure shown in FIG. 13 and synthesizes the respective image data D22 of the odd number sub-fields and the even number sub-fields into image data D2 of each field. That is, the original field image data is reconstructed by combining together every second pixel on each line from the image data of the two sub-fields, i.e. the odd number column and the even number column, forming the same field sequentially output from the filter section 20.

Next, in step S35, the D/A conversion section 30 performs a D/A conversion on the image data D2 obtained from the field synthesizing section 25 so that this is converted into interlaced format video signals P2 that are then output. In this processing by the D/A converter 30, the temporal order of the two sub-fields forming the same field is maintained.

As a result of the above, a series of processes for mitigating VDT stress is performed on interlaced format video signals output from an external image signal output device, and these signals are then output to an unillustrated image display device.

According to the fourth embodiment, in addition to the effects of the first embodiment, the below effects are also achieved.

(1) Because each field is divided into an odd number sub-field and an even number sub-field and a temporal filtering process is performed on each sub-field, it is possible to attenuate frequency components in the horizontal direction of the screen and frequency components in the vertical direction of the screen, and it is thus possible to effectively mitigate VDT stress.

(2) Moreover, because a temporal filtering process is performed on each sub-field, it is possible to reduce the size of the buffer memory for image data of each low pass filter forming the filter section 20.

Note that, in the fourth embodiment, the first field was divided into two sub-fields. However, it is also possible for the dividing to be performed in even smaller units and to set the number of divisions to meet requirements. If the number of field divisions is increased, the spatial filtering effect is striking and it becomes possible to even more effectively mitigate VDT stress using a regular spatial pattern Moreover, it is also possible to combine the VDT stress risk quantifying device according to the second embodiment with the VDT stress mitigating device according to the fourth embodiment.

Furthermore, in the fourth embodiment, the A/D conversion process and the field dividing process were performed separately. However, it is also possible, for example, to separate and extract video signals of the odd number columns and the even number columns and to perform the A/D conversion process on each respectively. In fact, any means may be used provided that the result thereof allows the obtaining of image data in which one field is divided into an odd number sub-field and an even number sub-field. In the same way, any means may also be employed for the D/A conversion process and the field synthesizing process.

Moreover, in the fourth embodiment, the number of low pass filter stages in the filter section 20 was set at four. However, the number of stages may be reduced to three or less, or may be increased to five or more. In addition, the number of low pass filter stages may be set appropriately, in accordance with the necessary filter characteristics.

In addition, in the fourth embodiment, analog quantity video signals P1 are converted into digital quantity image data D1 by the A/D converter 10, and digital quantity image data D2 is converted into analog quantity video signals P2 by the D/A converter 30. However, as was described in the first embodiment, these conversion functions can be omitted where necessary.

Furthermore, as was described in the first embodiment, it is also possible to perform the temporal filtering process using data extending over three or more fields, or to perform a spatial filtering processing in combination therewith.

The first through fourth embodiments of the present invention have been described above. However, the present invention is not limited to these embodiments, and, provided that a temporal filtering process is performed without a distinction being made between fields, then any such structure is included in the scope of the present invention. Moreover, any alteration in design that does not depart from the intention of this invention is also included within the scope of the present invention. For example, in the above embodiments, the device was realized as hardware. However, it may also be realized as software. In this case, if a program describing the functions of the device is recorded on a recording medium, then it is possible to construct the VDT stress mitigating device according to the present invention on a computer or to transfer it to another computer.

As has been described above, according to the present invention, the following effects can be obtained.

This means that because a temporal filtering process is performed on the image signals of each of a first and second field without any distinction being made between these fields and while the temporal order of these fields is maintained, temporal and spatial filtering processes are performed on the image signals and it is possible to mitigate VDT stress caused by a regular spatial pattern and VDT stress caused by flicker due to the interlaced format.

Moreover, because an index value representing the risk of VDT stress from image signals is calculated thus allowing the stress to be quantified, and because the index value is reflected and predetermined frequency components included in the image signals are attenuated such that the risk is suppressed, it is possible to mitigate VDT stress in accordance with the degree of the risk of VDT stress.

Further, because each field of an image signal is divided into a plurality of sub-fields, and a temporal filtering process is performed on the image signals of each sub-field without any distinction being made between the plurality of sub-fields and while the temporal order of the sub-fields is maintained, a spatial filtering process is performed in a screen horizontal direction and in a screen vertical direction, and it is possible to more effectively mitigate VDT stress.

Furthermore, because an image signal is imported and held temporarily, and because a temporal filtering process is performed on the image signals of each of a first and second field without any distinction being made between these fields and while the temporal order of these fields is maintained, and because an index value representing the risk of VDT stress is calculated on the basis of the difference between the image signal that has undergone the temporal filtering process and the held image signal, it is possible to quantify the risk of VDT stress and to detect this risk.

What is claimed is:

1. A VDT stress mitigating device that is provided between an image signal output device for outputting image signals based on an interlaced format and an image display device for displaying an image based on the image signal, and performs processing on the image signal in order to mitigate VDT stress, and comprises:

filter means for performing a temporal filtering process on the image signals of each of a first and second field without any distinction being made between the first and second fields and while the temporal order of these fields is maintained wherein the filter means comprises: a signal importing section for sequentially importing the image signals in units of fields; a field dividing section for dividing each field of the image signals into a plurality of sub-fields; a low pass filter section for performing a temporal filtering process on image signals of each sub-field without distinguishing between the plurality of sub-fields and while maintaining the temporal order of the sub-fields, and for attenuating predetermined frequency components contained in an image formed by the image signals; a field synthesizing section for synthesizing image signals of each field from image signals of each sub-field in which the predetermined frequency components have been attenuated; and a signal output section for sequentially outputting in accordance with the temporal order the image signals of each field that have been synthesized by the field synthesizing section.

2. A VDT stress mitigation method for mitigating VDT stress by attenuating predetermined frequency components of image signals based on an interlaced format, comprising the following steps:

(a) a signal importing step in which the image signals are sequentially imported in units of fields;

(b) a field dividing step in which each field of the image signals is divided into a plurality of sub-fields;

(c) a filtering step in which a temporal filtering process is performed on image signals of each sub-field without distinguishing between the plurality of sub-fields and while maintaining the temporal order of the sub-fields, and for attenuating predetermined frequency components contained in an image formed by the image signals;

(d) a field synthesizing step for synthesizing image signals of each field from image signals of each sub-field in which the predetermined frequency components have been attenuated; and (e) a signal output step in which synthesized image signals of each field are sequentially output in accordance with the temporal order.

3. The VDT stress mitigation method according to claim 2, wherein, in the filtering step, temporal frequency components that are contained in an image formed by the image signals and that are equivalent to a frame scan frequency are attenuated.

4. The VDT stress mitigation method according to claim 2, wherein, in the filtering step, spatial frequency components that are contained in an image formed by the image signals and that are the highest spatial frequency components in a direction orthogonal to a scan line direction on a device on which the image is displayed are attenuated.

* * * * *